US012725195B2

(12) United States Patent
Joshi et al.

(10) Patent No.: US 12,725,195 B2
(45) Date of Patent: Sep. 1, 2026

(54) DETECTING COMPATIBILITY MISMATCH BY GENERATIVE ARTIFICIAL INTELLIGENCE

(71) Applicant: eBay Inc., San Jose, CA (US)

(72) Inventors: Sachin Joshi, San Jose, CA (US); Srikanth Rentachintala, San Jose, CA (US); Brandon Everett Smith, San Jose, CA (US)

(73) Assignee: eBay Inc., San Jose, CA (US)

( * ) Notice: Subject to any disclaimer, the term of this patent is extended or adjusted under 35 U.S.C. 154(b) by 23 days.

(21) Appl. No.: 18/603,576

(22) Filed: Mar. 13, 2024

(65) Prior Publication Data

US 2025/0292309 A1 Sep. 18, 2025

(51) Int. Cl.
*G06Q 30/06* (2023.01)
*G06Q 30/0601* (2023.01)

(52) U.S. Cl.
CPC ... *G06Q 30/06314* (2025.08); *G06Q 30/0601* (2013.01); *G06Q 30/0627* (2013.01); *G06Q 30/06433* (2025.08)

(58) Field of Classification Search
CPC ......... G06Q 30/0601; G06Q 30/06314; G06Q 30/0627; G06Q 30/06433
USPC ......................................................... 705/26.7
See application file for complete search history.

(56) References Cited

U.S. PATENT DOCUMENTS 7,885,862 B1 * 2/2011 Vincent .................. G06Q 30/02 705/26.61
8,386,336 B1 2/2013 Fox et al.
9,665,900 B1 5/2017 Claeson et al.
10,509,962 B2 12/2019 Zheng et al.
10,640,060 B2 * 5/2020 Chen ...................... G07C 5/085
(Continued)

FOREIGN PATENT DOCUMENTS

CN 120655310 A 9/2025
DE 102020129563 A1 * 5/2022 ......... G06Q 60/0623
EP 4617989 A1 9/2025

OTHER PUBLICATIONS

Ebay , "eBay Acquires the myFitment Group of Companies to Enhance Part and Accessories Listing Experience", retrieved from the internet on Nov. 1, 2023, <https://investors.ebayinc.com/investor-news/press-release-details/2022/eBay-Acquires-the-myFitment-Group-of-Companies-to-Enhance-Part-and-Accessories-Listing-Experience/default.aspx>, Aug. 23, 2022, 2 pages.
(Continued)

*Primary Examiner* — Yogesh C Garg
(74) *Attorney, Agent, or Firm* — FIG. 1 Patents

(57) ABSTRACT

Detecting compatibility mismatch by generative artificial intelligence is described. Compatibility data is obtained (e.g., by accessing a database). The compatibility data is associated with a compatibility between items (e.g., items and categories of vehicles or an item and another item) and includes a list of recommended compatibilities between the items and a user reported compatibility for at least one item. A machine learning model is generated for detecting a compatibility mismatch between a first item and a second item and/or between an item and a category of vehicle. At least a portion of the compatibility data is provided as input to generative artificial intelligence to generate the machine learning model. An update to the list of recommended compatibilities is determined based on the detected compatibility mismatch.

20 Claims, 9 Drawing Sheets

(56) References Cited

U.S. PATENT DOCUMENTS

| | | | | |
|---|---|---|---|---|
| 11,430,037 | B2 | 8/2022 | Boo et al. | |
| 11,475,660 | B2 | 10/2022 | Guo | |
| 2009/0019008 | A1 * | 1/2009 | Moore | G06Q 30/02 |
| 2018/0047071 | A1 | 2/2018 | Hsu et al. | |
| 2022/0351066 | A1 | 11/2022 | Bikumala et al. | |
| 2023/0274795 | A1 * | 8/2023 | Holzer | C12N 15/1089 506/8 |
| 2023/0334547 | A1 | 10/2023 | Lagoni et al. | |
| 2024/0257199 | A1 * | 8/2024 | Unnikrishnan | G06Q 30/0202 |
| 2025/0141684 | A1 * | 5/2025 | Kaspa | H04L 9/50 |

OTHER PUBLICATIONS

Ebay , “Vehicle compatibility {fitment): guide for eBay sellers”, retrieved from the internet on Nov. 1, 2023, <https://export.ebay.com/en/marketing/ebay-services-and-tools-help-seller/vehicle-compatibility-fitment-guide-for-ebay-sellers/>, 2023, 11 pages.

Sitecore Staff , “Essential advice for optimizing your auto parts ecommerce site”, retrieved from the internet on Nov. 1, 2023, <https://www.sitecore.com/blog/commerce/auto-parts-ecommerce-site<, 2023, 18 pages.

“EP Search Report”, EP Application No. 25151126.7, Jun. 17, 2025, 16 pages.

Office Action issued in EP 25151126.7, mailed Dec. 11, 2025, 11 pages.

* cited by examiner

200
User input 124
Machine learning model(s) 128
Detected compatibility mismatch data 202
Machine learning model(s) training 204
Compatibility mismatch indication 140

300
User Input 124
User A: It didn't fit the head light housing.
User B: This doesn't fit my YYYY, Make, Model vehicle. Plug isn't matching.
User C: The item does not fit my car.
User D: Works great! 5/5.
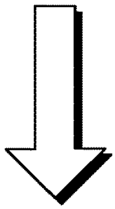
Machine learning model(s) 128
Extract items for detecting compatibility mismatch 302
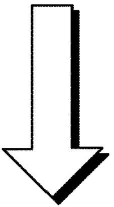
Compatibility Mismatch Indication 140
FIG. 3

Figure 7:
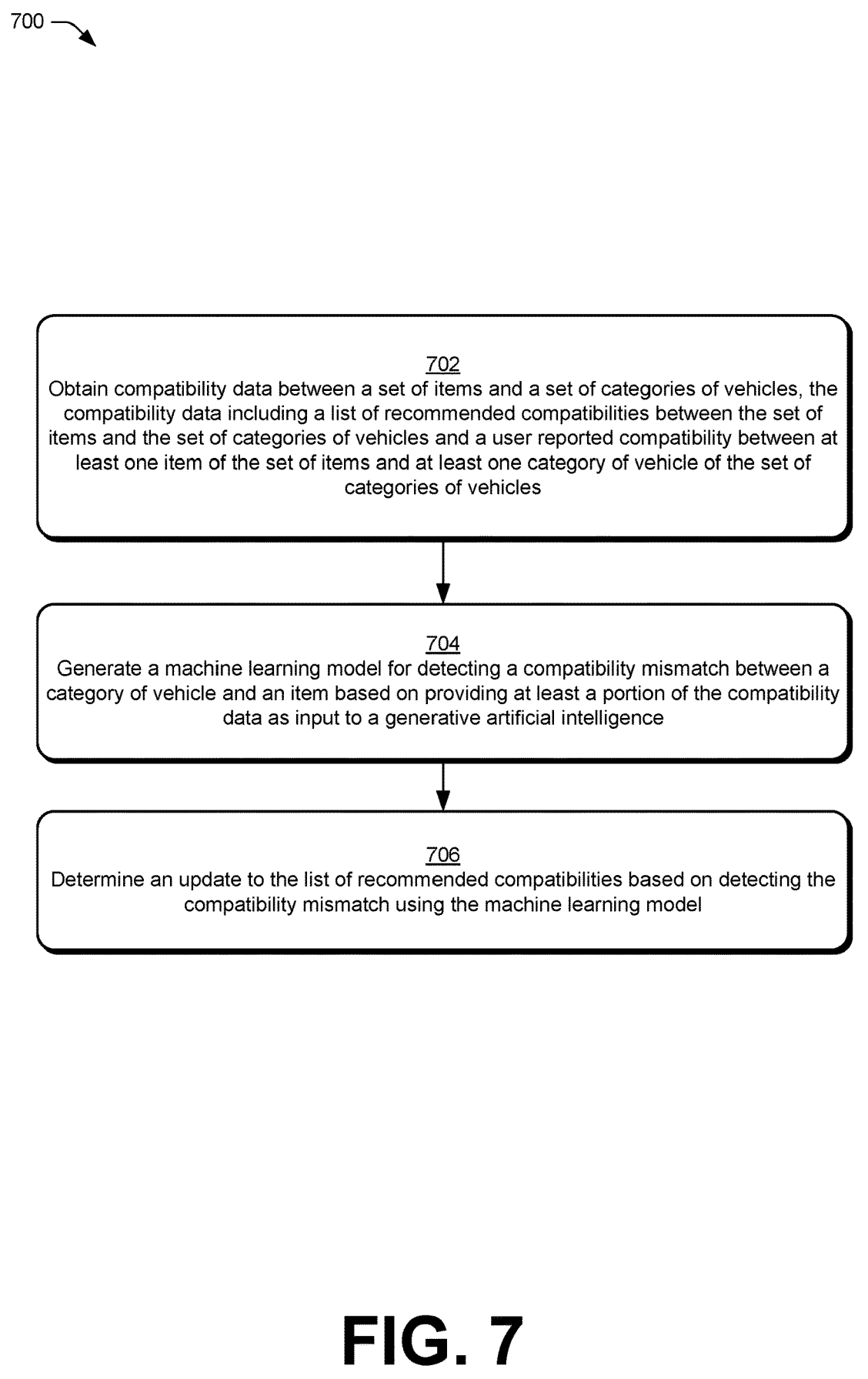

700

702
Obtain compatibility data between a set of items and a set of categories of vehicles, the compatibility data including a list of recommended compatibilities between the set of items and the set of categories of vehicles and a user reported compatibility between at least one item of the set of items and at least one category of vehicle of the set of categories of vehicles 704
Generate a machine learning model for detecting a compatibility mismatch between a category of vehicle and an item based on providing at least a portion of the compatibility data as input to a generative artificial intelligence 706
Determine an update to the list of recommended compatibilities based on detecting the compatibility mismatch using the machine learning model

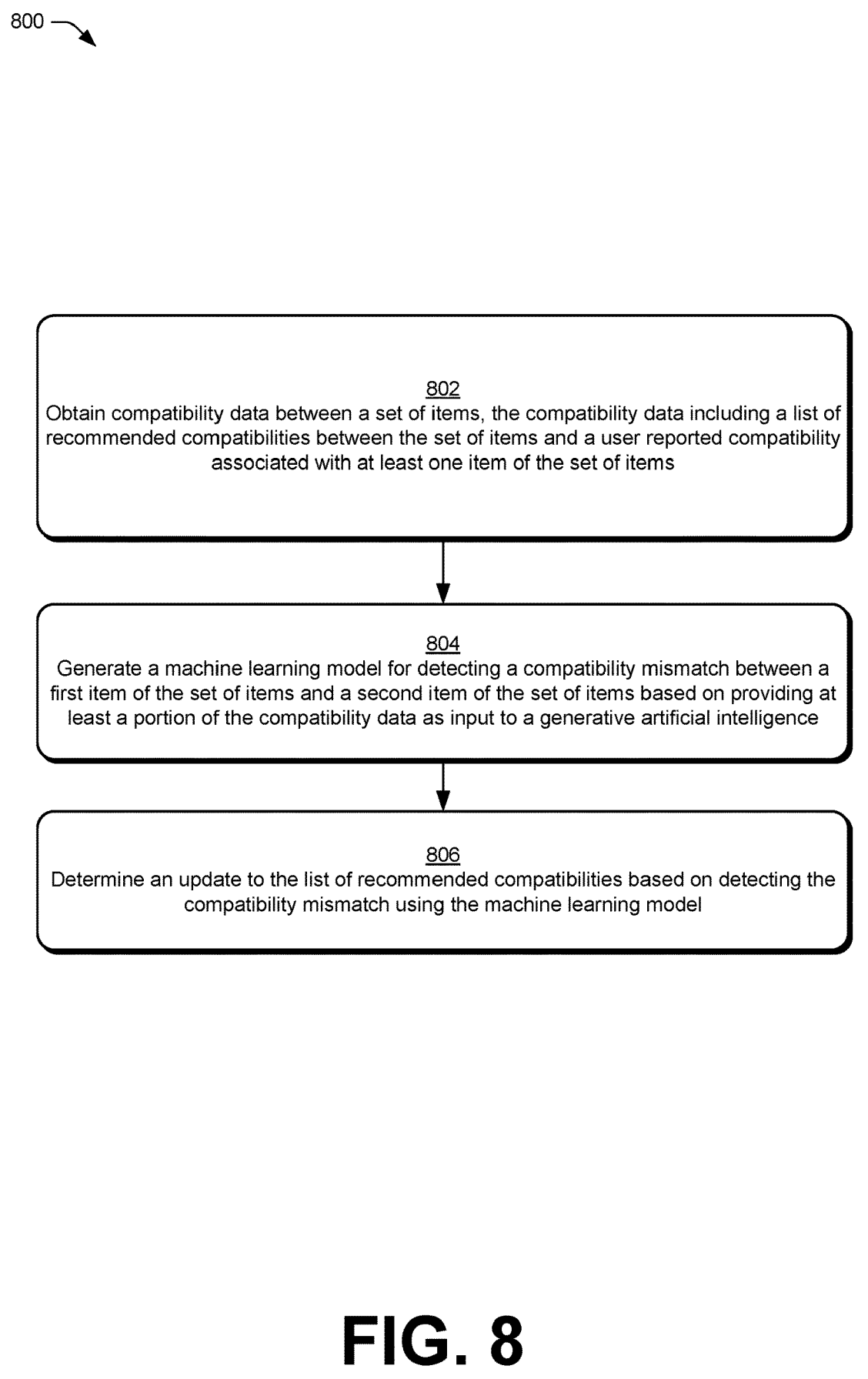

802
Obtain compatibility data between a set of items, the compatibility data including a list of recommended compatibilities between the set of items and a user reported compatibility associated with at least one item of the set of items 804
Generate a machine learning model for detecting a compatibility mismatch between a first item of the set of items and a second item of the set of items based on providing at least a portion of the compatibility data as input to a generative artificial intelligence 806
Determine an update to the list of recommended compatibilities based on detecting the compatibility mismatch using the machine learning model

FIG. 8

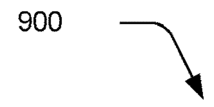
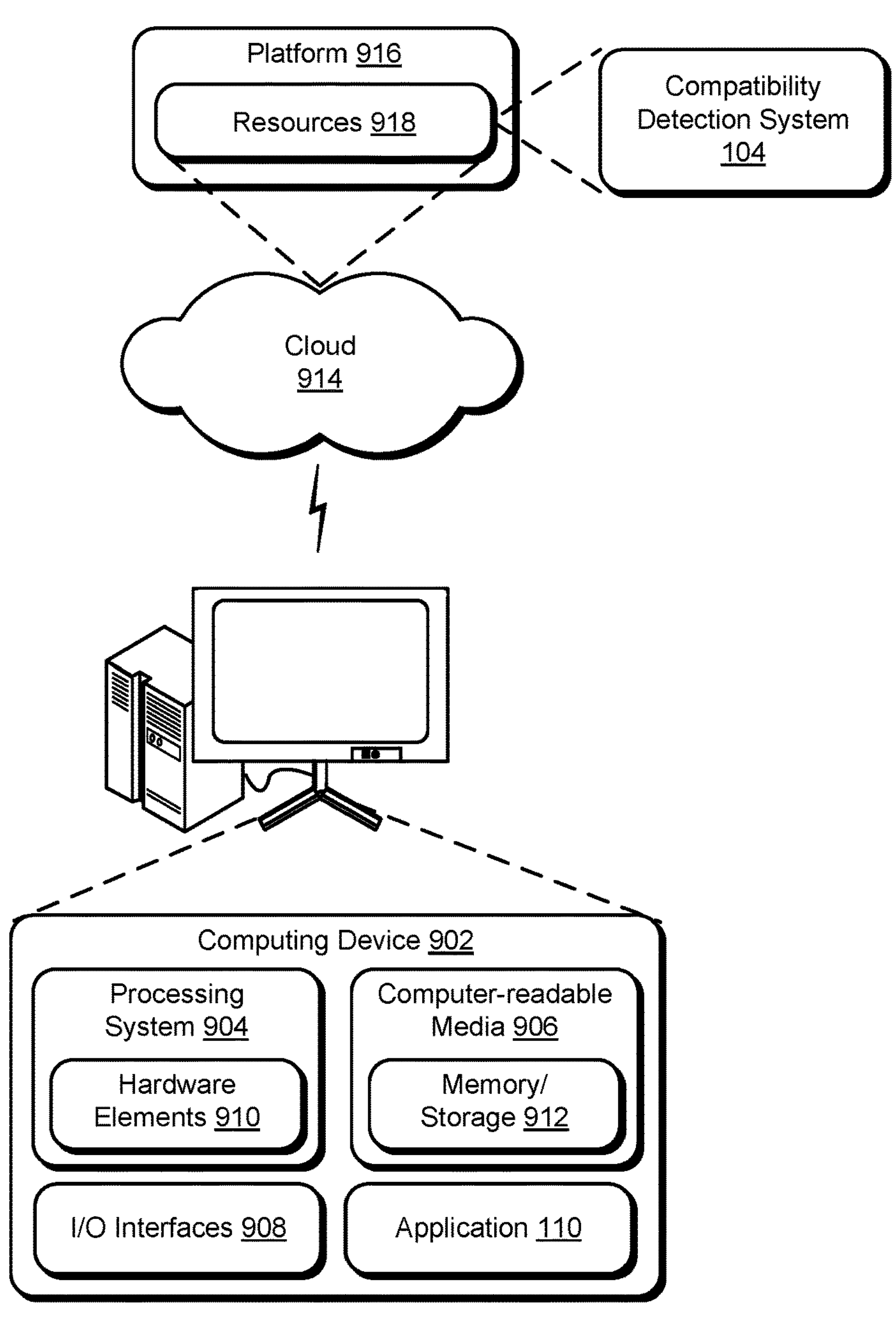
FIG. 9

DETECTING COMPATIBILITY MISMATCH BY GENERATIVE ARTIFICIAL INTELLIGENCE

BACKGROUND

A computer system may implement machine learning techniques, or artificial intelligence, to generate an output given a prompt as input. For example, a computer system may utilize a generative artificial intelligence model to generate content, data, or outputs that were not explicitly programmed or provided to the generative artificial intelligence model in training data. The generative artificial intelligence model is trained using deep learning techniques (e.g., neural networks) to detect patterns and structures within the training data. In some examples, the generative artificial intelligence model may include one or more machine learning models for generating an output (e.g., text) in response to prompts or queries. The machine learning models may capture patterns and relationships in data, enabling the models to detect context, generate coherent text, and perform various natural language processing tasks.

SUMMARY

A compatibility detection system obtains, analyzes, and maintains recommended compatibilities for items. In some examples, the compatibility detection system obtains compatibility data that describes a compatibility between an item and a device or an apparatus, such as a vehicle. For example, the item may be a replacement component for a component of a vehicle. The compatibility data may describe a compatibility between the item and a type of the device or the apparatus (e.g., a make and/or a model, among other identifying characteristics, if the apparatus is a vehicle). The item may be compatible with the device or the apparatus if the item meets operation criteria for the device or the apparatus, measurement criteria for integration with the device or the apparatus, manufacture criteria for integration with the device or the apparatus, among other parameters and criteria. The compatibility detection system may generate a machine learning model for detecting a compatibility mismatch between a category or type of the apparatus and the item, such as by inputting the compatibility data to generative artificial intelligence. The compatibility detection system may update a list of recommended compatibilities if a compatibility mismatch is detected and/or may generate an indication of the compatibility mismatch.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIGS. 2 through 4 depict compatibility mismatch detection logic in an example implementation of detecting compatibility mismatch by generative artificial intelligence.

FIGS. 7 and 8 depict a procedure in an example implementation of detecting compatibility mismatch by generative artificial intelligence.

FIG. 9 illustrates an example of a system that includes an example computing device that is representative of one or more computing systems and/or devices that may implement the various techniques described herein.

DETAILED DESCRIPTION

Overview

Figure 1:
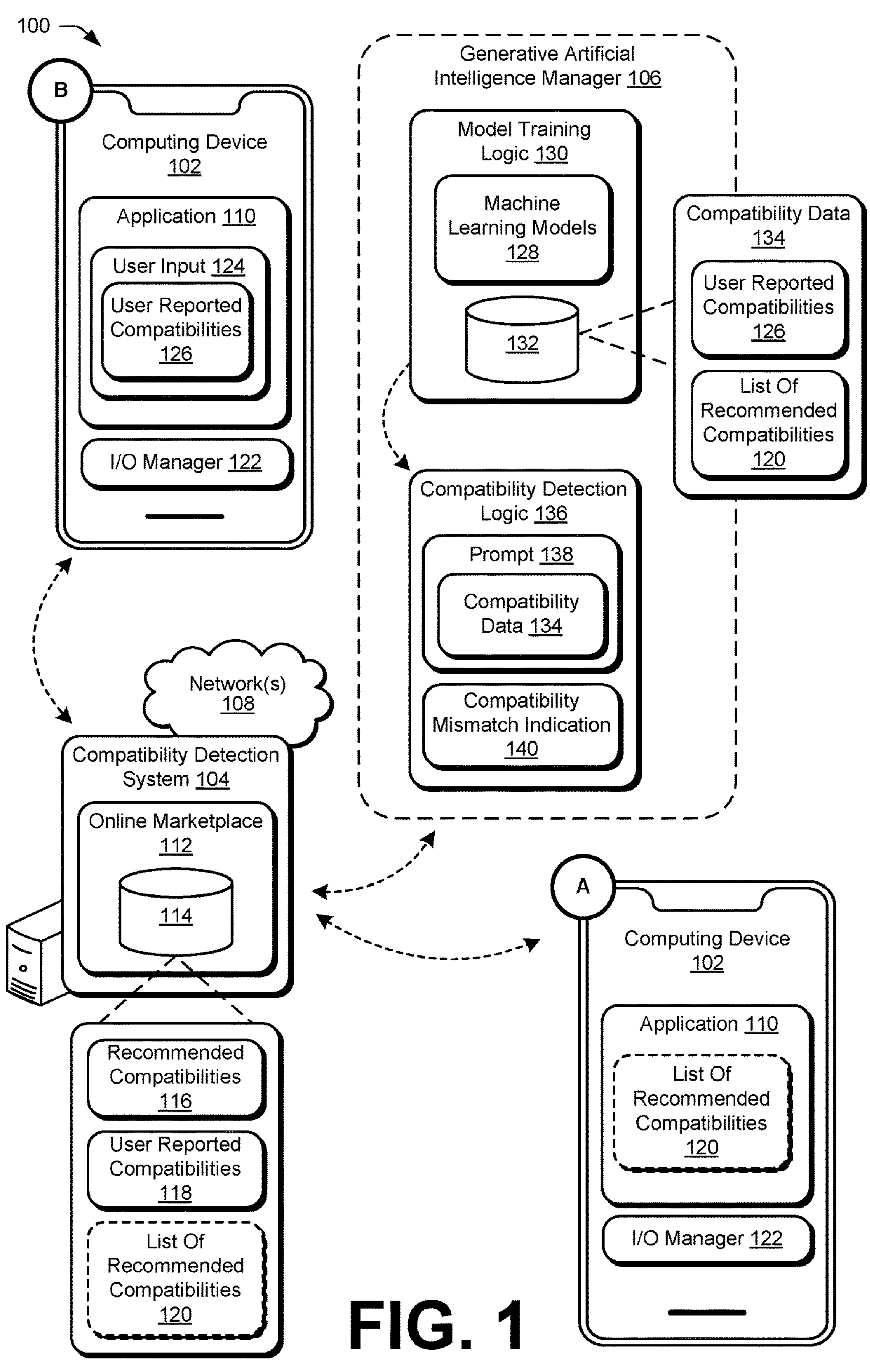
FIG. 1 is an illustration of an environment in an example implementation that is operable to employ techniques described herein.

Compatibility mismatch detection for an item using generative artificial intelligence is described. In accordance with the described techniques, a compatibility detection system inputs data to generative artificial intelligence (e.g., one or more machine learning models) and receives an output from the generative artificial intelligence indicating one or more items that are not compatible with a device or an apparatus, referred to as a compatibility mismatch. The machine learning models are trained to detect a compatibility mismatch between an item and an apparatus indicated by the input data and output information that indicates the detected compatibility mismatch. For example, if the item is a component of a vehicle, then the compatibility detection system may input data including reviews of the item to the machine learning models. The machine learning models may process the data and output an indication of one or more vehicles (e.g., a type of the vehicles) that are incompatible with the item.

An online marketplace application may facility the exchange of items between users of the online marketplace application. For example, a seller may input data to the online marketplace application to be included in a listing of an item for sale on the online marketplace application, and a buyer may provide user input to initiate a transaction to purchase the item listed for sale. In some examples, the online marketplace application may include a relatively large numerical quantity of listings of items for sale (e.g., greater than a threshold value, millions of items per year). One or more items may interface with one or more other items. For example, the items may include components or accessories of vehicles, home appliances, electronic devices, mechanical devices, and/or other apparatuses. In some other examples, the items may include the vehicles, the home appliances, the electronic devices, the mechanical devices and/or the other apparatuses.

In some cases, such as for items that interface with other items, there may be a compatibility criteria between the items that is based on operation of the items when installed. The compatibility criteria of the items may include a capability of the items, physical characteristics of the items, mechanical characteristics of the items, and/or software characteristics of the items, among other criteria. For example, a vehicle component may be compatible with a make and model of a vehicle but may not be compatible with a make and model of another vehicle due to a difference in physical dimensions for an interface of the component with the vehicle. In some other examples, a television may be compatible with a software system of one or more audio components of a first type but may not be compatible with a software system of one or more audio components of a second type (e.g., a different manufacturer) due to differences in operating system, system architecture, and/or security protocol differences, among others.

The online marketplace application may maintain a list indicating items that satisfy the compatibility criteria, referred to as a list of recommended compatibilities. For example, the list may include an indication of other items that are compatible with a respective item for the items listed for sale in the online marketplace application. The online marketplace application may display the list of recommended compatibilities or may otherwise indicate the list of recommended compatibilities to a user that is purchasing an item to reduce compatibility mismatch between items by informing a user of compatibilities. However, due to the relatively large numerical quantity of listings of items on the online marketplace application, the list of recommended compatibilities may include errors and/or may not be maintained resulting in outdated information. In some cases, a user (e.g., a seller of an item) may manually input the compatibility information for an item to the online marketplace application, which may introduce errors due to typos, incorrect data, and the like from manually inputting the compatibility information. If a user acquires the item from the online marketplace application (e.g., a buyer purchases and receives the item), then the user may not determine the item is incompatible with another item (e.g., a device or apparatus) until attempting to use the item. If the item has a compatibility mismatch, then the user may return the item and/or may acquire a different item from the online marketplace application to replace the item. A user returning an item and/or acquiring a replacement item may cause inefficient use of computational resources (e.g., processing and memory resources) due to increased search queries for the item and/or the replacement item and increased exchange of transaction information when returning the item and/or ordering the replacement item. Further, a user may not recognize that the item has a compatibility mismatch with another item and may use the item, causing premature degradation of the items and/or failure of the items, among other disadvantages.

As described herein, to prevent inefficient use of computational resources and/or degradation and failure of items, a compatibility detection system may obtain information indicating a compatibility mismatch between one or more items, referred to as compatibility data. In some cases, the compatibility data may include an explicit indication of the compatibility mismatch, such as a user input including comments indicating that the item is incompatible with another item (e.g., a device or apparatus). In some other cases, the compatibility data may include an implicit indication of the compatibility mismatch. For example, the compatibility data may include an indication that a user returned an item. The compatibility detection system may determine the item interfaces with one or more other items related to the user from user data for the user and may infer that the item was returned due to incompatibility with the other items (e.g., due to language in a review of the item, historical transaction data of purchases made by the user, and/or compatibility information of the items, among other factors).

In some examples, the compatibility detection system may train one or more machine learning models to detect a compatibility mismatch from the compatibility data, such as one or more machine learning models implemented by generative artificial intelligence. For example, the compatibility detection system may use a list of recommended compatibilities between items and one or more compatibilities between items reported by users as training data to train and/or fine-tune the machine learning models, which is described in further detail with respect to FIGS. 1 and 2. Once the machine learning models are trained, the compatibility detection system may provide compatibility data as input to the machine learning models and may receive an indication of one or more compatibility mismatches between items as output from the machine learning models. In some examples, the compatibility data may include audio, text, and/or visual data input by a user, such as one or more reviews and/or other comments related to the items. In some cases, the compatibility detection system may indicate for a computing device to display the indication of the compatibility mismatches (e.g., via a graphical user interface (GUI)), such that a user may update the list of recommended capabilities between items. In some other cases, the compatibility detection system may automatically (e.g., without user input or independent of user input) update the list of recommended capabilities between items.

In some aspects, the techniques described herein relate to a computer-implemented method including obtaining compatibility data between a plurality of items and a plurality of categories of vehicles, the compatibility data including a list of recommended compatibilities between the plurality of items and the plurality of categories of vehicles and a user reported compatibility between at least one item of the plurality of items and at least one category of vehicle of the plurality of categories of vehicles, generating a machine learning model for detecting a compatibility mismatch between a category of vehicle and an item based on providing at least a portion of the compatibility data as input to a generative artificial intelligence, and determining an update to the list of recommended compatibilities based on detecting the compatibility mismatch using the machine learning model.

In some aspects, the techniques described herein relate to a computer-implemented method, where generating the machine learning model further includes modifying one or more parameters of the machine learning model until a performance criteria associated with the machine learning model is satisfied.

In some aspects, the techniques described herein relate to a computer-implemented method, where modifying the one or more parameters of the machine learning model is based on providing additional compatibility data as input to the generative artificial intelligence.

In some aspects, the techniques described herein relate to a computer-implemented method, where detecting the compatibility mismatch further includes providing additional compatibility data including at least one user reported compatibility corresponding to the category of vehicle and the item as input to the machine learning model based on the performance criteria associated with the machine learning model being satisfied.

In some aspects, the techniques described herein relate to a computer-implemented method, where the performance criteria include one or more of a threshold precision metric associated with the machine learning model, a threshold recall metric associated with the machine learning model, a threshold F1 score associated with the machine learning model, or a threshold return rate associated with the plurality of items.

In some aspects, the techniques described herein relate to a computer-implemented method, where detecting the compatibility mismatch further includes receiving, as output from the machine learning model, an indication of the compatibility mismatch based on providing at least one user reported compatibility corresponding to the category of vehicle and the item as input to the machine learning model.

In some aspects, the techniques described herein relate to a computer-implemented method, further including transmitting an indication of the update to the list of recommended compatibilities to a device for display to a user.

In some aspects, the techniques described herein relate to a computer-implemented method, further including receiving, in response to the indication, a request to perform the update to the list of recommended compatibilities.

In some aspects, the techniques described herein relate to a computer-implemented method, further including performing the update to the list of recommended compatibilities, where the update to the list of recommended compatibilities includes one or more of removing the category of vehicle from a list of recommended compatibilities for the item or adding the category of vehicle to the list of recommended compatibilities for the item.

In some aspects, the techniques described herein relate to a computer-implemented method, further including transmitting a request for the compatibility data to a device for display to a user, receiving user input corresponding to one or more of the list of recommended compatibilities or the user reported compatibility in response to the request, and storing the one or more of the list of recommended compatibilities or the user reported compatibility at a database based on processing the user input to determine the user reported compatibility.

In some aspects, the techniques described herein relate to a computer-implemented method, where the processing further includes parsing the user input to determine respective string values and respective character values corresponding to one or more of the at least one item or the at least one category of vehicle.

In some aspects, the techniques described herein relate to a system including one or more processors, and a computer-readable storage medium storing instructions that are executable by the one or more processors to perform operations including obtaining compatibility data between a plurality of items, the compatibility data including a list of recommended compatibilities between the plurality of items and a user reported compatibility associated with at least one item of the plurality of items, generating a machine learning model for detecting a compatibility mismatch between a first item of the plurality of items and a second item of the plurality of items based on providing at least a portion of the compatibility data as input to a generative artificial intelligence, and determining an update to the list of recommended compatibilities based on detecting the compatibility mismatch using the machine learning model.

In some aspects, the techniques described herein relate to a system, where to generate the machine learning model, the operations further include modifying one or more parameters of the machine learning model until a performance criteria associated with the machine learning model is satisfied.

In some aspects, the techniques described herein relate to a system, where modifying the one or more parameters of the machine learning model is based on providing additional compatibility data as input to the generative artificial intelligence.

In some aspects, the techniques described herein relate to a system, where to detect the compatibility mismatch, the operations further include providing additional compatibility data including at least one user reported compatibility corresponding to the first item and the second item as input to the machine learning model based on the performance criteria associated with the machine learning model being satisfied.

In some aspects, the techniques described herein relate to a system, where to detect the compatibility mismatch, the operations further include receiving, as output from the machine learning model, an indication of the compatibility mismatch based on providing at least one user reported compatibility corresponding to the first item and the second item as input to the machine learning model.

In some aspects, the techniques described herein relate to a system, where the operations further include transmitting an indication of the update to the list of recommended compatibilities to a device for display to a user.

In some aspects, the techniques described herein relate to a system, where the operations further include performing the update to the list of recommended compatibilities, where the update to the list of recommended compatibilities includes one or more of removing the first item from a list of recommended compatibilities for the second item, removing the second item from a list of recommended compatibilities for the first item, adding the first item to the list of recommended compatibilities for the second item, or adding the second item to the list of recommended compatibilities for the first item.

In some aspects, the techniques described herein relate to a system, where the operations further include transmitting a request for the compatibility data to a device for display to a user, receiving user input corresponding to one or more of the list of recommended compatibilities or the user reported compatibility in response to the request, and storing the one or more of the list of recommended compatibilities or the user reported compatibility at a database based on processing the user input to determine the user reported compatibility.

In some aspects, the techniques described herein relate to one or more computer-readable storage media including computer-executable instructions stored thereon that, responsive to execution by one or more processors, perform operations including obtaining compatibility data between a plurality of items and a plurality of categories of vehicles, the compatibility data including a list of recommended compatibilities between the plurality of items and the plurality of categories of vehicles and a user reported compatibility between at least one item of the plurality of items and at least one category of vehicle of the plurality of categories of vehicles, generating a machine learning model for detecting a compatibility mismatch between a category of vehicle and an item based on providing at least a portion of the compatibility data as input to a generative artificial intelligence, and determining an update to the list of recommended compatibilities based on detecting the compatibility mismatch using the machine learning model.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes one or more computing devices 102 and a compatibility detection system 104. In some examples, the compatibility detection system 104 includes a generative artificial intelligence manager 106 to train, fine-tune, and/or implement generative artificial intelligence. In one or more implementations, the computing devices 102 and the compatibility detection system 104 are communicatively coupled, one to another, via network(s) 108. One example of the network(s) 108 is the Internet, although the computing devices 102 and the compatibility detection system 104 may be communicatively coupled using one or more different connections or different networks (e.g., wireless networks) in various implementations.

Although the compatibility detection system 104 is depicted in the environment 100 as being separate from the computing devices 102, in one or more implementations, an entirety, or various portions of the compatibility detection system 104 are implemented at or by the computing devices 102. In at least one implementation, for example, at least a portion of the compatibility detection system 104 is implemented by an application 110 of the computing devices 102 and/or using various resources of the computing devices 102, such as hardware resources, an operating system, firmware, and so forth. Alternatively, or additionally, the compatibility detection system 104 is implemented by server-based storage resources, processing resources, and so on of devices other than the computing devices 102. For example, at least a portion of the compatibility detection system 104 is implemented using a third-party service, such as a web services platform that provides one or more hardware and/or other computing resources to support provision of services by web service providers. In variations, an entirety, or various portions of the compatibility detection system 104 are implemented at or by a device of the user (e.g., a mobile device, a laptop, a wearable device, or any other device).

Computing devices 102 that implement the environment 100 are configurable in a variety of ways. A computing device 102, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an augmented reality and/or virtual reality device (e.g., the smart glasses), a server, and so forth. Thus, a computing device 102 ranges from full resource devices with substantial memory and processor resources to low-resource devices with limited memory and/or processing resources. Although in instances in the following discussion reference is made to a computing device 102 in the singular, a computing device 102 may also be representative of multiple different devices, such as multiple servers of a server farm utilized to perform operations "over the cloud" as further described in relation to FIG. 8.

In at least one implementation, the application 110 supports communication of data across the network(s) 108 between the computing device 102 and the compatibility detection system 104. By supporting such data communication, the application 110 provides a respective user of the computing device 102 (and users of other computing devices 102) access to an online marketplace 112. For example, the computing device 102 receives data from the compatibility detection system 104. Based on the received data, the application 110 causes various systems of the computing device 102 to output user interfaces of the online marketplace 112, such as by displaying user interfaces via display devices or making accessible voice-based user interfaces.

Through interaction of a user with the computing device 102, the application 110 receives user input via one or more user interfaces of the online marketplace 112. Examples of such input include, but are not limited to, receiving touch input in relation to portions of a displayed user interface, receiving one or more voice commands or other audio input, receiving typed input (e.g., via a physical or virtual ("soft") keyboard), receiving mouse or stylus input, and so forth. One example of the application 110 is a browser, which is operable to navigate to a website of the online marketplace 112, display pages of the website, and facilitate user interaction with web pages of the website of the online marketplace 112. Another example of the application 110 is a web-based computer application of the online marketplace 112, such as a mobile application or a desktop application. The application 110 may be configured in different ways, which enable users to interact with their computing devices 102 and by extension perform actions on the online marketplace 112, without departing from the spirit or scope of the techniques described herein.

In one or more implementations, users register to obtain respective user accounts with the online marketplace 112. Such registration may include, for instance, providing an email address and establishing a username and password combination. Subsequent to registering computing devices 102 facilitate signing into, or otherwise authenticating to, the user account in various ways, such as by receiving a username and matching password, receiving biometric information (e.g., at least one image captured of a face or information captured of another body part such as a thumb or finger) that suitably matches stored biometric information associated with the user account, and so forth.

Broadly speaking, the online marketplace 112 is configured to generate listings for items and to expose those listings (e.g., publish them) to one or more computing devices 102. For example, the online marketplace 112 may generate listings for items for sale and expose those listings to computing devices 102, such that the users of the computing devices 102 can interact with the listings via user interfaces to initiate transactions (e.g., purchases, add to wish lists, share, and so on) in relation to the respective item or items of the listings. In accordance with the described techniques, the online marketplace 112 is configured to generate listings for one or more items of various types of physical goods or property (e.g., components of a device or apparatus, accessories of a device or apparatus, clothing and/or clothing accessories, collectibles, furniture, decorative items, textiles, luxury items, electronics, real property, physical computer-readable storage having one or more video games stored thereon, and so on), services (e.g., babysitting, dog walking, house cleaning, and so on), digital items (e.g., digital images, digital music, digital videos) that can be downloaded via the network(s) 108, and blockchain backed assets (e.g., non-fungible tokens (NFTs)), to name just a few.

The online marketplace 112 is configured to generate listings for items that may interface with aspects of other items, such as an apparatus and/or device. In some cases, the online marketplace 112 may include listings for a component of another item, accessories for another item, and/or items that are configurable to interact or interface with systems of other items. For example, the online marketplace 112 may include listings for components and/or accessories of an electrical and/or mechanical device or apparatus, such as a vehicle, a cellular device or other electronic device, a laptop computer, or a household appliance, just to name a few.

In some cases, a vehicle component may interface with other components of the vehicle, including components that are part of an electrical and/or mechanical system of the vehicle. For example, the online marketplace 112 may include one or more listings for brake pads for a vehicle. A braking system of the vehicle may include one or more components including the brake pad, a brake rotor or disc, calipers, brake fluid, a backing plate that provides structural support for the brake pad, among other components. During installation of the brake pad and during operation of the vehicle, the brake pad may interface with the other components of the braking system. For example, the brake pad may physically couple with the caliper and the backing plate to ensure the brake pad is positioned to make physical contact with the brake rotor or disc to generate friction for stopping the vehicle during operation.

Although a brake pad is provided as an example, there may be any numerical quantity of items listed on the online marketplace 112 that interface with other items. For example, a television listed on the online marketplace 112 may interface with one or more input/output (I/O) devices, including an audio output system, a gaming control system, home automation devices, among others. Similarly, home appliances may have one or more components that interface with each other, including a water filter for a water system in a refrigerator appliance. Thus, an item interfacing with another item, system, apparatus, or device may include a physical coupling, an electric or electronic coupling, and/or a mechanical coupling.

In some examples, a compatibility of the items may depend on the interface, such as a mechanical operability of the items, an electric operability of the items, or both. If an item negatively impacts operation of another item, such as by reducing an efficiency of operation of the item or by causing the item to fail to operate, then the item may not be compatible with the other item. In some examples, a threshold impact to the operation of an item for compatibility may be defined by a manufacturer of the item. For example, one or more vehicle manufacturers may specify a set of tolerances, or thresholds, for operation of individual components of the vehicle. An item not being compatible with another item may be referred to as a compatibility mismatch.

In some examples, a compatibility mismatch may be due to one or more capabilities of the items (e.g., mechanical and/or electrical capabilities), one or more physical characteristics of the items, one or more mechanical characteristics of the items, and/or one or more software characteristics of the items, among other characteristics of the items. The capabilities of the items may include a capability to connect wirelessly to a network or to another item (e.g., a device or apparatus), a processing capability of the items, a memory capability of the items, or a display capability of the items, among other capabilities. The physical characteristics of the items may include one or more of an I/O interface at the items, one or more physical dimensions defining a size and/or shape of the items, one or more physical coupling points of the items (e.g., a location of coupling, including a location of screws, bolts, rivets, clamps, ties, etc.), or one or more physical features of the items, among other physical characteristics. The one or more software characteristics of the items may include a software system (e.g., an operating system or other system) of the items, a software architecture implemented at the items, or a security software interface implemented at the items, among other software characteristics.

For example, a television may not have wireless connectivity capabilities (e.g., Wi-Fi and/or Bluetooth) for interfacing with one or more other systems, including an audio output system. Thus, an audio output system that operates using wireless connections may not be compatible with the television, while an audio output system that has a wired connection may be compatible with the television. In some other examples, a brake pad may be compatible with a brake system of a vehicle if the physical dimensions of the brake pad satisfy one or more threshold physical dimensions for interfacing with a brake rotor or disc and/or a caliper, among other components in the brake system of the vehicle. In yet other examples, a thermostat may operate using a software system that is compatible with a software system of a set of home automation devices but is not compatible with a software system of a different set of home automation devices. An item may satisfy one or more criteria or conditions for compatibility to be compatible with another item. In some cases, the items may have the capabilities, physical characteristics, mechanical characteristics, and/or the software characteristics that satisfy the criteria or conditions for compatibility. For example, the items may have wireless connectivity capabilities, may satisfy one or more thresholds related to physical dimensions and/or a threshold tolerance for location of a coupling point, may have compatible software systems, and the like. In some other cases, the items may not have one or more of capabilities, physical characters, mechanical characteristics, and/or software characteristics that satisfy the criteria or conditions for compatibility, and therefore may be incompatible or may have a compatibility mismatch.

In the illustrated environment 100, the online marketplace 112 includes storage device 114, which is depicted as storing compatibility information. The compatibility information includes, but is not limited to, recommended compatibilities 116, user reported compatibilities 118, and, in some cases, a list of recommended compatibilities 120. Additionally, or alternatively, the storage device 114 of the online marketplace 112 stores information related to one or more listings of items for sale, including real-time listing data for listings on the online marketplace 112, purchase history and/or transaction data related to purchases of users (e.g., based on a user identifier from a user account, including a username of the account or other identifier), information input by the user, information inferred about the user based on the transaction data, or the like. The storage device 114 may represent one or more databases and/or other types of storage capable of storing the compatibility information. Examples of the storage device 114 include, but are not limited to, mass storage and virtual storage. In one or more implementations, for example, the storage device 114 may be virtualized across multiple data centers and/or cloud-based storage devices. The compatibility detection system 104 may implement the online marketplace 112 by using servers that execute stored instructions to deploy various services of the compatibility detection system 104, such that those services perform numerous computations which are effective to provide the functionality described above and below. It is to be appreciated that the online marketplace 112 may include more, fewer, or different components without departing from the spirit or scope described herein.

In variations, the computing device 102 may collect user input and provide information to a user using an I/O manager 122. The I/O manager may configure the computing device 102 to display, or otherwise present, controls that are selectable by a user to provide user input 124 and/or prompts requesting user input 124. In some examples, the I/O manager 122 displays the controls and/or prompts to the user via a GUI of a computing device 102. In some other examples, the I/O manager displays the request to the user via a GUI of another device communicatively coupled with the computing device 102 (e.g., another computing device 102 coupled with the computing device 102 via the networks 108). The I/O manager can visually display the controls and/or the prompts, can emit an audio version of the controls and/or the prompts via an audio output component, or the like.

In some examples, the I/O manager 122 receives user input 124 via one or more input components of the user interface. The user input 124 may be in response to a request for user input 124 from the computing device and/or may be initiated by a user of the computing device 102. Examples of such user input 124 include, but are not limited to, receiving touch input in relation to portions of a displayed user interface, receiving one or more voice commands, receiving typed input (e.g., via a physical or virtual ("soft") keyboard), receiving mouse or stylus input, and so forth.

A user may input information via interactable elements of the GUI (e.g., fill in a text element, elect a selectable element, or the like). The information may include details about an item associated with the user (e.g., owned by the user and/or otherwise interacted with by the user). For example, the user may input information for identifying a type of a vehicle associated with the user, including a make of the vehicle, a year the vehicle was manufactured, a model of the vehicle, a trim level of the vehicle, or an engine of the vehicle, among other information, which is described in further detail with respect to FIG. 5. The I/O manager 122 can store the information input by the user (e.g., at a local database) for access upon request by the compatibility detection system 104. Additionally, or alternatively, computing device 102 may transmit the information input by the user to the compatibility detection system 104 for storage at the storage device 114. In some examples, the compatibility detection system 104 may store the information input by the user with an associated user identifier (e.g., for a user account of the user that input the information).

In one or more implementations, the online marketplace 112 is accessible by decentralized computing devices that correspond to "clients" of the online marketplace 112 (e.g., users that have accounts with the online marketplace 112). In some cases, there may be different types of user accounts registered at the online marketplace 112. For example, the different types of user accounts may include seller user accounts and buyer user accounts. A seller user account may provide for a user to input information for listing items for sale via the online marketplace 112. A buyer user account may provide for a user to input transaction information for purchasing an item listed for sale via the online marketplace 112. The computing device 102 may display different user interfaces of the online marketplace 112 for a buyer account than for a seller account. In variations, the user account may be both a buyer account and a seller account, and a computing device 102 may include a control that is selectable to toggle between different user interfaces of the online marketplace 112. The user interfaces may include different GUI displays, referred to as a seller display and a buyer display. For a seller display, the computing device 102 may display one or more controls selectable by the user to provide information related to a listing of an item for sale and/or prompts for the user to provide information related to the listing of the item for sale. The controls may include options for selecting a type and/or category of the item, selecting from a list of characteristics for the item based on inputting information about the item, or the like. The prompts may include a prompt to provide information about the item for sale, including a description of the item, a category of the item, a price for the item, and/or a condition of the item (e.g., new, used, etc.), among other information.

For a buyer display, the computing device 102 may display a search function for searching for an item from the item listings. Once a user inputs a search query for an item, then the computing device 102 may display query results that are selectable by the user. A query result may include items for sale with a title and/or information within a threshold match of the search query (e.g., a threshold numerical quantity of matching characters and/or string values of the search query and an item title and/or other information about an item). If the computing device 102 receives a selection of a query result, then the computing device 102 may display additional information about an item corresponding to the query result and one or more controls and/or prompts for the user to select an item for purchase, which is described in further detail with respect to FIG. 6.

In some cases, a user account for a user interacting with the online marketplace 112 via the computing device 102 labeled with "A" may be a seller user account. The application 110 may collect data from the user related to the online marketplace 112. For example, the application 110 may collect information about one or more items to be listed for sale at the online marketplace 112. In some examples, the information about the one or more items may include a list of recommended compatibilities 120 for one or more items. The list of recommended compatibilities 120 may include a list of one or more items (e.g., devices and/or apparatuses) that are compatible with an item for respective items listed by a seller user account. In variations, the seller user account maintains the list of recommended compatibilities 120. In some other variations, the compatibility detection system 104 and/or another system operating the online marketplace 112 maintains the list of recommended compatibilities 120.

In some other cases, a user account for a user interacting with the online marketplace 112 via the computing device 102 labeled with "B" may be a buyer user account. The application 110 may collect data from the user related to the online marketplace 112. For example, the computing device 102 may collect user input 124 via an interactable GUI of the computing device 102. In some examples, the user input 124 may explicitly indicate a compatibility of an item for sale via the online marketplace 112, referred to as a user reported compatibility 126. That is, the user input 124 may include text, audio, and/or visual user input 124 that indicates an item is not compatible with another item. In some other examples, the user input 124 may implicitly indicate a user reported compatibility 126 of an item for sale via the online marketplace 112. That is, the user input 124 may include text, audio, and/or visual user input 124 related to an item, and the compatibility detection system 104 may determine from the user input 124 that an item is not compatible with another item.

The online marketplace 112 may store transaction history data (e.g., at the storage device 114) indicating previous purchases by one or more users of the online marketplace 112. In some examples, the online marketplace 112 may store transaction data related to a purchase of an item. For example, a user may purchase a television, and the online marketplace 112 may store transaction data indicating that the user (e.g., with an associated user account and/or user identifier) purchased the television. The compatibility detection system 104 may access the transaction data, including historical transaction data, to determine whether an item is compatible with an apparatus using the implicit indication of the compatibility of the item. In some cases, a user reported compatibility 126 may indicate that a user returned an item that is capable of interfacing with another item that the user previously purchased. Additionally, or alternatively, a user reported compatibility 126 may indicate that a user returned an item and ordered a different item that is related to the item (e.g., a different type of the item, a similar item with a different manufacturer, a similar item with different characteristics, or the like). The compatibility detection system 104 may analyze the transaction history data and a user reported compatibility 126 to determine the item has a compatibility mismatch with an item.

For example, the compatibility detection system 104 may determine a user purchased a television and an audio system configured to interface with the television from the transaction history. The compatibility detection system 104 may determine the television and the audio system are configured to interface from a description in the item listing of the television or the audio system, from the list of recommended compatibilities 120, among other data sources. The compatibility detection system 104 may receive user input 124 indicating that the audio system is incompatible with the television (e.g., may detect an event triggering a return of the audio system, may detect an event triggering a purchase of a different audio system, may receive a review of the audio system indicating the compatibility mismatch, and/or another implicit or explicit indication of the compatibility mismatch). The compatibility detection system 104 may analyze the user input 124, the transaction history, and/or information from an item listing, among other data to detect the compatibility mismatch between the audio system and the television, and may additionally, or alternatively, detect that an alternate audio system (e.g., that a user ordered as a replacement) is compatible with the television.

In some examples, the user input 124 may include one or more reviews and/or comments related to an item listed via the online marketplace 112. For example, the computing device 102 may display a request via a GUI of the computing device 102 for the user to provide the user input 124. The computing device 102 may display the request based on a trigger condition, such as a user initiating a return for an item, a user initiating a transaction for an item, and/or a threshold duration from a user initiating a return for an item or a user initiating a transaction for an item. The request may be in the form of a message, such as via a communication platform (e.g., email messaging platform, text messaging platform, etc.) and/or via a user interface of the online marketplace 112 generated by the application 110. The request may include an indication for the user to provide a reason for return if the user initiates a return for the item and/or may provide a selectable list of reasons for return. The list of reasons for return may include compatibility mismatch, among other reasons for return.

In some examples, the online marketplace 112 may have a relatively large numerical quantity of items listed for sale (e.g., greater than a threshold, millions of listings of items for sale). The computing device 102 may display a list of recommended compatibilities 120 to indicate whether an item is compatible with one or more apparatuses. Additionally, or alternatively, the online marketplace 112 may include a filter feature, as described with reference to FIG. 5, that provides for a user to filter search results for items that are compatible with a defined or specified item. However, due to the relatively large numerical quantity of items listed for sale, the list of recommended compatibilities 120 for respective items may be outdated, inaccurate (e.g., may include errors), and/or may be incomplete. For example, the list of recommended compatibilities 120 for a respective item may incorrectly indicate one or more other items are compatible with the item. Additionally, or alternatively, the list of recommended compatibilities 120 for the respective item may not include one or more items that are compatible with another item. In some examples, if a seller user account is responsible for maintaining the list of recommended compatibilities 120, then a user of the seller user account may manually input compatible items for respective items. A user manually inputting compatible items may result in errors in the list of recommended compatibilities 120 due to the relatively large numerical quantity of items listed for sale at the online marketplace 112.

In some other examples, a computing device 102 and/or the compatibility detection system 104 may generate the list of recommended compatibilities 120 from data collected by the computing device 102 and/or the compatibility detection system 104 (e.g., user manual information for the item, manufacturer recommendations for the item, and/or other available information related to the item). However, the computing device 102 and/or the compatibility detection system 104 may be unable to verify that the list of recommended compatibilities 120 (e.g., either input by a user and/or generated from data collected by the computing device 102 and/or the compatibility detection system 104) is correct due to the lack of data available and/or due to the large numerical quantity of items listed for sale at the online marketplace 112. Thus, a user may purchase an item that interfaces with another item, and the user may determine the items are not compatible. The user may return an item and/or exchange an item for an alternative item due to the compatibility mismatch. A user returning or exchanging an item may increase use of computational resources due to increase signaling, processing, and memory usage for additional searches and transactions, resulting in computational inefficiencies at a computing device 102 and/or for the online marketplace 112. For example, a user may search for additional items causing additional use of processing and memory resources at the computing device 102, as well as high signaling overhead due to communications between the computing device 102 and the online marketplace 112 to populate search results for display at the computing device 102. In some other examples, to return an item, a user may input information to the computing device 102 to initiate the return, resulting in use of processing and memory resources at the computing device 102 and/or for the online marketplace 112 (e.g., due to relisting the item for sale once the return is complete), as well has high signaling overhead due to communications between the computing device 102 and the online marketplace 112 to initiate and complete a return process.

Further, in some examples, the compatibility mismatch may not inhibit a user from using the item. For example, one or more physical dimensions of the item may be within a tolerance or threshold for installing the item at an apparatus but may not be within a tolerance or threshold for operation of the apparatus. Thus, the user may attempt to operate the apparatus after installing an item that has a compatibility mismatch, causing degradation of the apparatus and/or the item and/or premature failure of the apparatus and/or item.

To prevent or reduce compatibility mismatch between items listed at an online marketplace 112 and one or more other items, the compatibility detection system 104 may implement generative artificial intelligence to detect the compatibility mismatch and may use the detected compatibility mismatch to update a list of recommended compatibilities 120 at the online marketplace 112. In one or more implementations, the compatibility detection system 104 implements a generative artificial intelligence manager 106 that trains, fine-tunes, and/or implements machine learning models 128. In one or more implementations, the compatibility detection system 104 may implement the generative artificial intelligence manager 106 by using servers that execute stored instructions to deploy various services of the compatibility detection system 104, such that those services perform numerous computations which are effective to provide the functionality described above and below. It is to be appreciated that the generative artificial intelligence manager 106 may include more, fewer, or different components without departing from the spirit or scope described herein.

In this example, the generative artificial intelligence manager 106 includes, or otherwise has access to, the model training logic 130. The generative artificial intelligence manager 106 can utilize the model training logic 130 to train or fine-tune one or more machine learning models 128. Example machine learning models include, but are not limited to, large language models and/or conditional generative models. A large language model is a type of artificial intelligence model designed to generate natural language. In some examples, large language models are pre-trained on a diverse text data set to learn structure, grammar, and semantics of language. A conditional generative model is an artificial intelligence model designed to generate an output using one or more input conditions or labels. Machine learning models 128 for generative artificial intelligence may be built using deep learning techniques and may have a greater numerical quantity of parameters than other artificial intelligence models. Unlike conventional artificial intelligence systems that rely on rule-based or deterministic approaches, generative artificial intelligence employs algorithms and models capable of autonomously producing output that closely resembles human-generated content. These algorithms are designed to learn patterns and structures from existing data and then use this learned information to generate new content that is coherent, relevant, and contextually appropriate.

Although the techniques are described leveraging generative artificial intelligence, in variations, different types of artificial intelligence may be leveraged without departing from the spirit or scope of the described techniques. For example, the generative artificial intelligence manager 106 may train and/or fine-tune any numerical quantity of machine learning models 128, such as to generate a distributed network of machine learning models 128. The distributed network may include a prompt engineer large language model that generates prompts for other machine learning models 128 that generate results. The machine learning models 128 that generate the results can be trained or fine-tuned to detect a compatibility mismatch between an item and an apparatus.

In some examples, a machine learning model 128 designed for generative artificial intelligence can be fine-tuned, or trained, for a specific application using data for the specific application. Fine-tuning a machine learning model 128 may include updating an existing, or pre-trained, machine learning model 128 by training the machine learning model 128 with a more specific dataset to adapt the machine learning model 128 to a task or context. The model training logic 130 is configured to access a storage device 132, which is depicted maintaining compatibility data 134, by executing a retrieve command to obtain the compatibility data 134. The storage device 132 may represent one or more databases and/or other types of storage capable of storing the compatibility data 134. Examples of the storage device 132 include, but are not limited to, mass storage and virtual storage. In one or more implementations, for example, the storage device 132 may be virtualized across multiple data centers and/or cloud-based storage devices.

In some examples, the compatibility data 134 include user reported compatibilities 126. For example, the computing device 102 may transmit data including the user reported compatibilities 126 to the compatibility detection system 104. The compatibility detection system 104 may filter the data to determine the user reported compatibilities 126 and may store the user reported compatibilities 126 at the storage device 132. The data may include one or more comments related to an item, one or more reviews related to an item, a reason for return of an item. The compatibility detection system 104 may preprocess the data by filtering the data to remove one or more values from the data (e.g., characters and/or string values) that do not indicate compatibility information related to whether the item is compatible with another item and/or an apparatus, or vice-versa, which is described in further detail with respect to FIG. 3. Additionally, or alternatively, the preprocessing may include updating a format of the data to a defined format for inputting to the machine learning models 128. The compatibility data 134 may include a list of recommended compatibilities 120, which the generative artificial intelligence manager 106 may obtain from the online marketplace 112.

Once the generative artificial intelligence manager 106 of the compatibility detection system 104 obtains the compatibility data 134, the compatibility detection system 104 can instruct the generative artificial intelligence manager 106 to generate one or more trained machine learning models for detecting compatibility mismatch between items and apparatuses. For example, the model training logic 130 can include instructions to input the compatibility data 134 to one or more machine learning models 128 during a fine-tuning procedure to generate trained machine learning models, which is described in further detail with respect to FIG. 3. The machine learning models 128 are trained to output an indication of one or more compatibility mismatches between an item and another item or apparatus based on inputting compatibility data 134 (e.g., some or all of the user reported compatibilities 126). The compatibility mismatches may include an item that is listed as compatible with another item or an apparatus that is not compatible with the other item or the apparatus, or vice-versa and/or an item that is not listed as compatible with another item or apparatus that is compatible with the other item or apparatus, or vice-versa. The machine learning models 128 may include any numerical quantity of models, including generative artificial intelligence models.

In some examples, the model training logic 130 may include instructions to continue to train the machine learning models 128 until a threshold amount or numerical quantity of data indicating user reported compatibilities 126 corresponding to a compatibility mismatch is received. For example, the generative artificial intelligence manager 106 may continue to input training datasets to the machine learning models 128 to train and/or fine-tune the machine learning models 128 until a numerical quantity of detected compatibility mismatches satisfies (e.g., is less than) a threshold value. That is, the generative artificial intelligence manager 106 may continue to train the machine learning models 128 until a numerical quantity of compatibility mismatches detected from comments, reviews, and/or other user reported data falls below a threshold value. The compatibility detection system 104 may define the threshold value using one or more factors, including a numerical quantity of listings in the online marketplace 112 with compatibility information, a total amount or numerical quantity of data entries from user input, or any other factors.

In some cases, the generative artificial intelligence manager 106 includes compatibility detection logic 136 for detecting compatibility mismatch of an item and another item and/or apparatus using the machine learning models 128 trained by the model training logic 130. The generative artificial intelligence manager 106 can input a prompt 138 to the machine learning models 128, and the machine learning models 128 generate a compatibility mismatch indication 140 as output. In some examples, the prompt 138 includes data, such as user reported compatibilities 126 for one or more items and/or apparatuses. The user reported compatibility 126 may include a set of text, audio, and/or visual data that explicitly or implicitly indicates that items listed for sale on the online marketplace 112 have a compatibility mismatch. Due to the relatively large numerical quantity of items listed for sale on the online marketplace 112, a user may be unable to manually sort through data including the user reported compatibilities 126. Thus, by implementing the machine learning models 128, the compatibility detection system 104 is able to identify and/or detect compatibility mismatches and generate a compatibility mismatch indication 140 for reporting to a user and/or for updating a list of recommended compatibilities 120 (e.g., without a user manually updating the list of recommended compatibilities 120). For example, the compatibility detection system 104 may report the compatibility mismatch indication 140 to a user (e.g., a seller) via a computing device 102. If the user maintains the list of recommended compatibilities 120, then the user may update the list of recommended compatibilities 120 based on the compatibility mismatch indication 140. If the compatibility detection system 104 maintains the list of recommended compatibilities 120, then the compatibility detection system may automatically update the list of recommended compatibilities 120 (e.g., without or independent of user input) and may indicate the updated to the list to a user (e.g., a seller).

Although not depicted, in some examples, the compatibility detection system 104 and the computing devices 102 implement a communications manager to support communication of data across the network(s) 108 between the computing devices 102 and the compatibility detection system 104. By supporting such data communication, the communications manager provides the computing devices 102 access to compatibility mismatch detection techniques otherwise inaccessible by the compatibility computing devices 102. In one or more implementations, the compatibility detection system 104 and the computing devices 102 exchange data using the communications manager (e.g., data including the user reported compatibilities 126, the list of recommended compatibilities 120, and/or the compatibility mismatch indication 140). The I/O manager 122 of the computing devices 102 can display the compatibility mismatch indication 140 and/or an indication of one or more updates to the list of recommended compatibilities 120 to a user via a GUI of the computing devices 102, via an audio output component of the computing devices 102, via a haptic component of the computing devices 102, such as through vibration of the computing device, or any combination thereof.

The compatibility detection system 104 may use the machine learning models 128 to build a self-learning system that analyzes user input 124 (e.g., return comments, reviews, feedback, etc.) to improve accuracy of a list of recommended compatibilities 120 for items listed for sale at the online marketplace. The self-learning system may analyze the user input 124, detect compatibility mismatches, and adapt the list of recommended compatibilities 120 accordingly (e.g., by adding or removing compatibilities between items and/or vehicle categories from the list). One or more users may be unable to process the user input 124 manually due to the relatively large numerical quantity of user input 124 for the online marketplace (e.g., greater than a threshold, millions of different user input 124), as well as the complexity and diversity of the content of the user input 124.

Having considered an example of an environment, consider now a discussion of some example details of the techniques for detecting compatibility mismatch by generative artificial intelligence in accordance with one or more implementations.

Detecting Compatibility Mismatch by Generative Artificial Intelligence

Figure 2:
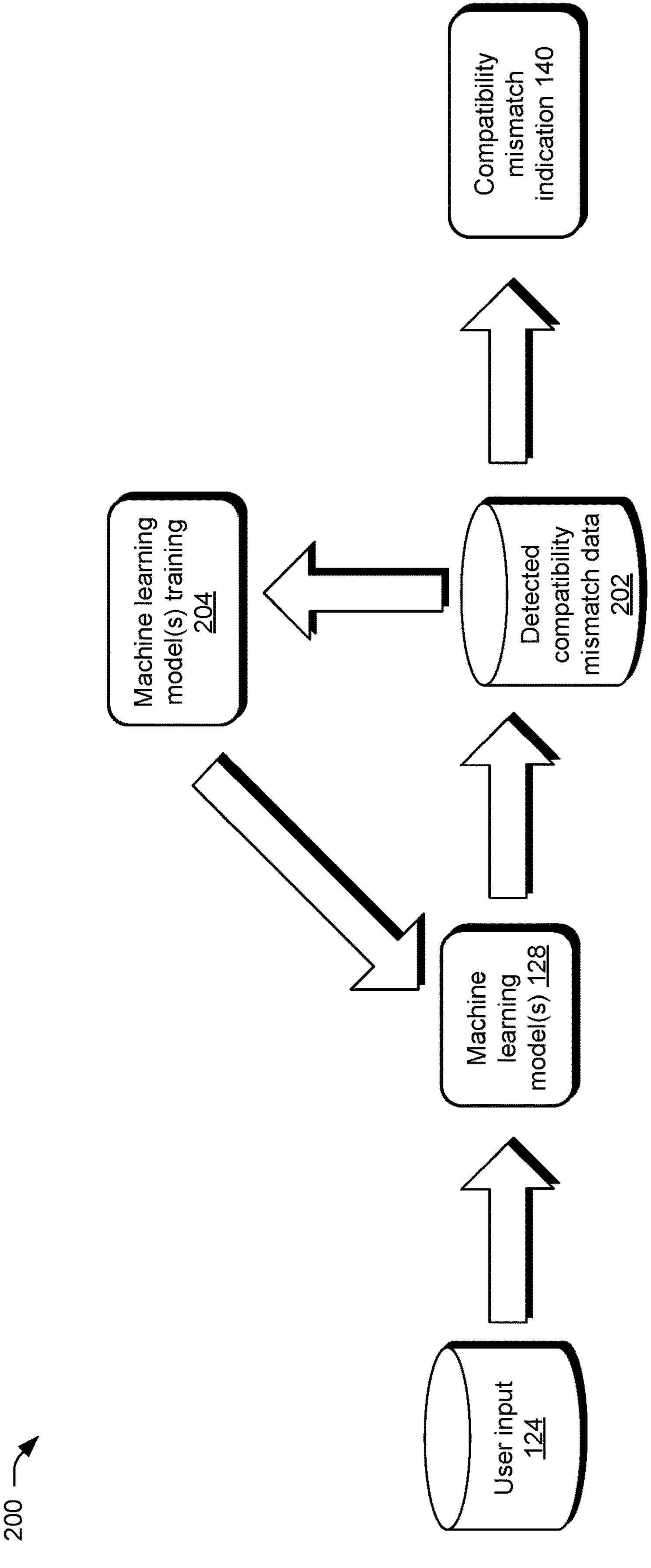

FIG. 2 depicts compatibility mismatch detection logic 200 in an example implementation of detecting compatibility mismatch by generative artificial intelligence.

The compatibility mismatch detection logic 200 may implement, or be implemented by, aspects of FIG. 1. For example, the compatibility mismatch detection logic 200 may be implemented by a compatibility detection system, such as the compatibility detection system 104 as described with reference to FIG. 1. In one or more implementations, the compatibility mismatch detection logic 200 may include user input 124, one or more machine learning models 128, and a compatibility mismatch indication 140, which may be examples of the corresponding features as described with reference to FIG. 1.

In some examples, the compatibility mismatch detection logic 200 includes obtaining user input 124 and inputting the user input 124 to one or more machine learning models 128. The user input 124 may be filtered and/or otherwise preprocessed prior to being input to the machine learning models 128. The filtering and/or preprocessing of the data may include removing aspects of the data that are not relevant or related to a compatibility of an item with another item and/or with an apparatus, which is described in further detail with respect to FIG. 3. In some cases, the user input 124 may include one or more user indicated or user reported compatibilities between an item and another item and/or apparatus (e.g., a user reported compatibility 126, as described with reference to FIG. 1). For example, the user input 124 may include an explicit indication indicating an item is, or is not, compatible with another item and/or an apparatus. In some other examples, the user input 124 may include an implicit indication, such as an indication of an item being returned. If the user input 124 includes an implicit indication, then the compatibility of the item with another item and/or an apparatus may be determined from previous user purchases and/or details related to the item and/or the apparatus, among other data.

In some examples, the machine learning models 128 may output a compatibility mismatch indication 140 that indicates detected compatibility mismatch data 202. The detected compatibility mismatch data 202 may include data entries detected from the user input 124 that indicate one or more items or apparatuses that are not compatible but are listed as compatible in a list of recommended compatibilities (e.g., a list of recommended compatibilities 120 as described with reference to FIG. 1). For example, the detected compatibility mismatch data 202 may include one or more vehicle components that are not compatible with respective vehicle types and/or categories of vehicles, where the vehicle components are listed as compatible with the respective vehicle types and/or categories of vehicles in the list of recommended compatibilities for the vehicle components. Compatibility information related to vehicles may be referred to as fitment data, where fitment refers to the compatibility of an auto part (e.g., vehicle component) with a specified vehicle category or vehicle type. In some examples, the compatibility mismatch indication 140 may trigger transmission of a message to a user account (e.g., seller feedback file feeds), display of a message to a user account (e.g., via a GUI), and/or may trigger an update to the list of recommended compatibilities 120 (e.g., catalog the updates for compatibility mismatches).

In variations, the system may perform machine learning model training 204. For example, the system may use a portion of the user input 124 as test data for training the machine learning models 128, as well as evaluating the performance of the machine learning models 128. The system may receive the detected compatibility mismatch data 202 as output from the machine learning models 128 in response to inputting the test data and may compare the output to a known set of compatibility mismatches from the test data. The system may update one or more parameters (e.g., weights) of the machine learning models 128 according to the evaluation, such as based on a precision metric, a recall metric, and/or an F1 score that define the performance of the machine learning model 128. An F1 score is a harmonic mean of precision and recall for a machine learning model 128 and has a value in a range between 0 and 1.

The system may refine the machine learning models 128 by updating hyperparameters, fine-tuning the machine learning models 128, and/or changing a training dataset until a performance criteria for the machine learning models 128 is met. The performance criteria may include satisfying respective threshold values for the precision metric, the recall metric, and/or the F1 score. Additionally, or alternatively, the performance criteria may include satisfying a threshold return rate for one or more items listed for sale in the online marketplace. The hyperparameters of a machine learning model 128 include one or more settings for the machine learning model 128 that are defined for the machine learning model 128, such as a learning rate, a batch size, a numerical quantity of hidden layers (e.g., for neural networks), one or more regularization parameters, a kernel size, among other parameters. Training of the machine learning models 128 is further described with reference to FIG. 4.

FIG. 3 depicts compatibility mismatch detection logic 300 in an example implementation of detecting compatibility mismatch by generative artificial intelligence.

The compatibility mismatch detection logic 300 may implement, or be implemented by, aspects of FIG. 1. For example, the compatibility mismatch detection logic 300 may be implemented by a compatibility detection system, such as the compatibility detection system 104 as described with reference to FIG. 1. In one or more implementations, the compatibility mismatch detection logic 300 may include user input 124, one or more machine learning models 128, and a compatibility mismatch indication 140, which may be examples of the corresponding features as described with reference to FIGS. 1 and 2.

In some examples, a compatibility detection system may collect data, including user input 124. For example, the compatibility mismatch detection logic 300 includes obtaining the user input 124, such as a from a database or other data storage. The user input 124 may include one or more reviews, comments, and/or reason for return of an item listed for sale at an online marketplace. A computing device (e.g., a computing device 102, as described with reference to FIG. 1) may receive a command from a user with a corresponding user account to initiate a purchase of the item, such as via a user interface displaying items for sale at the online marketplace. The compatibility detection system may prompt the user to provide the user input 124. For example, the compatibility detection system may indicate for the computing device to display a request for feedback for a user account that initiated the purchase of the item. The computing device may receive the user input 124 in response to the request for feedback.

In some cases, the user input 124 may include text data, audio data, and/or video data. The user input 124 may include an identifier, such as a username, for a respective user that provided the user input 124. The compatibility detection system may infer from the identifier and/or from other application data provided by the computing device which item the user input 124 corresponds to. For example, the user input 124 may include an identifier "User A" and corresponding text data "It didn't fit the head light housing." The compatibility detection system may determine that the user input 124 corresponds to a headlight item (e.g., from purchase history transaction data for a corresponding user account and/or from information provided by the computing device). Additionally, or alternatively, the user input 124 may include an identifier "User B" and corresponding text data "This doesn't fit my YYYY, Make, Model vehicle," an identifier "User C" and corresponding text data "The item does not fit my car," and an identifier "User D" and corresponding text data "Works great! 5/5." Although four user identifier and text data examples are provided, the user input 124 may include any numerical quantity of data entries. For example, the user input 124 may include a relatively large numerical quantity of data entries (e.g., greater than a threshold value, millions of data entries), which a user may be unable to process manually.

In some examples, the compatibility mismatch detection logic 300 includes inputting the user input 124 to one or more machine learning models 128 trained to detect compatibility mismatch between an item listed for sale at an online marketplace and another item. At 302, the compatibility detection system may extract items from the user input 124 for detecting compatibility mismatch. If the user input 124 is text data, the compatibility detection system may parse the user input 124 to determine one or more items that interface with an item associated with the user input 124 (e.g., the item being reviewed). If the user input is audio data, then the compatibility detection system may convert the audio data to text data for parsing. If the user input is visual data (e.g., an image and/or a video), then the compatibility detection system may use image processing techniques, including feature and object detection techniques, to determine one or more items from the visual data. In some cases, such as if the user input 124 is for one or more vehicle components, extracting the items for detecting the compatibility mismatch may include extracting one or more vehicles mentioned in the user input 124 and/or indicated by a user that provides the user input 124. The machine learning models 128 may process the user input 124 to detect one or more compatibility mismatches between the extracted items and an item corresponding to the user input 124 (e.g., an item purchased by a user associated with a user account, an item being reviewed, an item linked to a comment and/or a return, etc.).

If one or more compatibility mismatches are detected, then the compatibility detection system may generate a compatibility mismatch indication 140. For example, the compatibility detection system may receive an indication of one or more compatibility mismatches, including data indicating an item and one or more corresponding items that are incompatible. Additionally, or alternatively, the compatibility mismatch indication 140 may include a text and/or audio output generated by one or more large language models. In variations, such as if a user maintains a list of recommended compatibilities, the compatibility mismatch indication 140 may include text indicating one or more suggested or recommended updates to a list of recommended compatibilities for one or more items listed for sale at the online marketplace. In some other variations, such as if the compatibility detection system maintains a list of recommended compatibilities, the compatibility detection system may update the list of recommended compatibilities using the data output from the machine learning models. The compatibility mismatch indication 140 may include text indicating one or more compatibilities on the list of recommended compatibilities for items listed for sale at the online marketplace are updated. The compatibility detection system may transmit, or otherwise trigger, output of the compatibility mismatch indication 140 for display at one or more computing devices of users (e.g., sellers of the one or more items with recommended updates or automatic updates to the list of recommended compatibilities).

Figure 4:
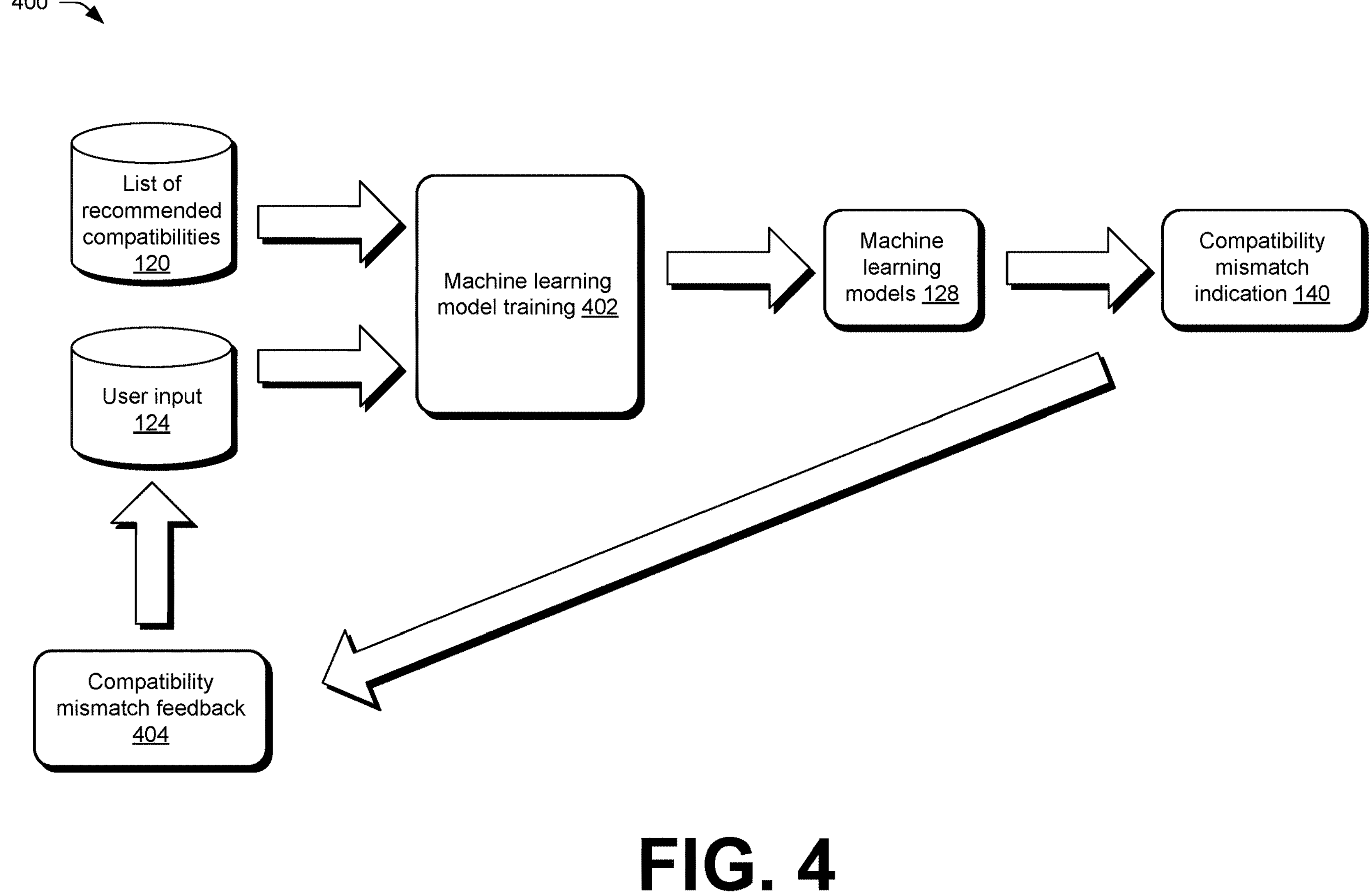

FIG. 4 depicts compatibility mismatch detection logic 400 in an example implementation of detecting compatibility mismatch by generative artificial intelligence.

The compatibility mismatch detection logic 400 may implement, or be implemented by, aspects of FIG. 1. For example, the compatibility mismatch detection logic 400 may be implemented by a compatibility detection system, such as the compatibility detection system 104 as described with reference to FIG. 1. In one or more implementations, the compatibility mismatch detection logic 400 may include a list of recommended compatibilities 120, user input 124, one or more machine learning models 128, and a compatibility mismatch indication 140, which may be examples of the corresponding features as described with reference to FIGS. 1 through 3.

The compatibility mismatch detection logic 400 may include a compatibility detection system obtaining a training dataset including a list of recommended compatibilities 120 and user input 124. The compatibility detection system may obtain the training dataset from a database or other data storage for an online marketplace. The training dataset may include existing data (e.g., the list of recommended compatibilities 120), which may be provided by a user, as well as the user input 124, which may include feedback, reviews, and/or other comments related to one or more items for sale at the online marketplace, as described with reference to FIG. 3. The compatibility detection system may clean and preprocess the collected, or obtained, data. For example, the compatibility detection system may remove one or more characters and/or string values from the user input 124 that are not relevant to compatibility detection. Example characters and/or string values that may be removed include, but are not limited to, characters and/or string values that do not include information describing an item compatibility for one or more items (e.g., an item purchased that is incompatible with another item already in possession by a user). Additionally, or alternatively, cleaning and preprocessing the data may include formatting the data (e.g., into individual data entries) to be used for input and/or training for machine learning models 128.

At 402, the compatibility mismatch detection logic 400 may include training the machine learning models 128 using one or more training datasets. In some examples, the machine learning models 128 are pretrained on a relatively large amount of data (e.g., greater than a threshold) to learn patterns in the data. The pretraining phase may include unsupervised training techniques in which the data is not labeled. The compatibility detection system may use a supervised learning technique to further train a pretrained generative artificial intelligence model (e.g., including the one or more machine learning models 128). The machine learning models 128 are trained on a training dataset at a lower learning rate than during the pretraining phase (e.g., by adjusting parameters of the model in step sizes that are less than a threshold value). The supervised learning technique may include inputting the preprocessed data as a training dataset to the machine learning models 128 and receiving an output indicating one or more compatibility mismatches detected from the preprocessed data (e.g., the compatibility mismatch indication 140). The machine learning models 128 can be an example of a distributed neural network including multiple machine learning models 128 and/or can include a single machine learning model 128.

Once the machine learning models 128 are trained on an initial training dataset, the compatibility detection system may evaluate the machine learning models 128 to determine whether the machine learning models 128 satisfy a performance criteria. In some cases, the compatibility detection system may evaluate the performance of the machine learning models 128 by inputting additional test data and comparing the output of the machine learning models 128 to known results. For example, at 404, the compatibility detection system may receive compatibility mismatch feedback and may use the compatibility mismatch feedback as additional test data. The compatibility detection system may determine one or more metrics from the evaluation, including a precision, recall, and F1 score for the machine learning models 128. Additionally, or alternatively, the compatibility detection system may monitor return rates for items purchased from the online marketplace, and may continue to train, fine-tune, and/or modify parameters of the machine learning models 128 until the return rates for items satisfy a threshold value. In some examples, the compatibility detection system may monitor return rates for items that are returned due to a compatibility mismatch (e.g., based on an indication from a user that the return is due to a compatibility mismatch and/or based on evaluating user input, including a review, comment, purchase history transaction data, or other input).

If the metrics and/or return rates satisfy one or more respective threshold values (e.g., the performance criteria), then the compatibility detection system may implement the machine learning models 128 to generate a compatibility mismatch indication 140 using user input 124 collected from the online marketplace. If the metrics fail to satisfy one or more respective threshold values, then the compatibility detection system may continue to fine-tune and/or train the machine learning models 128 using additional datasets. For example, the compatibility detection system may refine the machine learning models 128 by modifying (e.g., updating) one or more hyperparameters of respective machine learning models 128, fine-tuning the machine learning models 128, and/or changing the training dataset. Once the machine learning models 128 are trained and refined, the compatibility detection system may use the machine learning models 128 for detecting compatibility mismatches for items listed for sale at an online marketplace.

Figure 5:
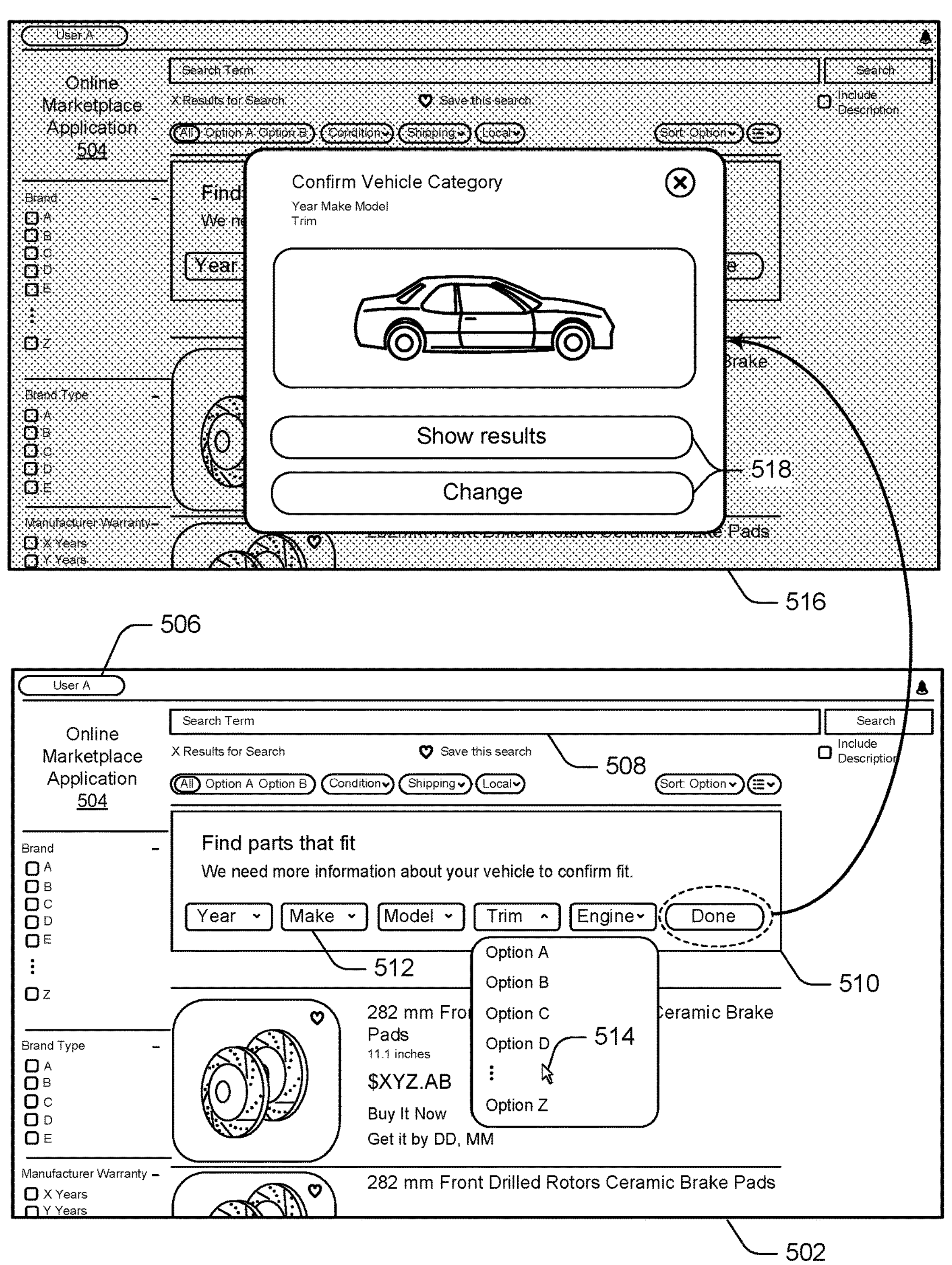
FIGS. 5 and 6 depict examples of user interfaces for detecting compatibility mismatch by generative artificial intelligence.

FIG. 5 depicts an example 500 of a user interface for detecting compatibility mismatch by generative artificial intelligence.

The illustrated example 500 includes displays via a user interface of a computing device, which is an example of the corresponding device as described with reference to FIG. 1. At a first time, the computing device generates the display 502. The display 502 may include an instance of an online marketplace application 504. The instance of the online marketplace application 504 may be associated with a user account (e.g., a buyer user account) with a corresponding identifier 506. The identifier 506 may be a username for the user account (e.g., "User A").

In some examples, the display 502 may include one or more features that a user may interact with, referred to as interactable features of the display 502 and/or of a user interface. For example, the display 502 may include a search feature 508 that provides for a user to input data. The search feature 508 may prompt for a user to input a search term or search query, such as a string and/or character value. The user may input the search term and/or the search query as text input via a component (e.g., a keyboard) coupled with the display 502. The online marketplace application 504 may propagate one or more results using the search query. For example, the online marketplace application 504 may access a database storing listings of items for sale and may compare the search query to information stored for respective items for sale. The online marketplace application 504 may select one or more of the respective items based on a similarity between the search query and the information satisfying a threshold value (e.g., having a threshold numerical quantity of string or character values that match).

The display 502 may include a control panel 510 with one or more input features 512 for collecting information about an item and/or apparatus of a user (e.g., owned by the user or otherwise in possession of by the user). The input features 512 may include one or more drop down menus, one or more features for collecting text, audio, and/or visual input, or any other option selectable by a user. For example, a user may manually input the information about the item (e.g., a vehicle). In some other examples, a user may upload an image of an item, and the online marketplace application 504 may use image processing techniques (e.g., feature detection, object detection etc.) to identify one or more items and/or apparatuses from the image. In variations, the item and/or the apparatus is a vehicle, and the input features 512 include a year, a make, a model, a trim, and/or an engine, among other vehicle identifiers. The control panel 510 may include a prompt "Find parts that fit," as well as "We need more information about your vehicle to confirm fit," to instruct the user to provide vehicle information. The input features 512 may include a drop-down menu that lists options for different features of a vehicle. For example, the drop-down menu for specifying a trim of a vehicle may include Option A through Option Z. The user may navigate the control panel 510 using a navigation tool 514 (e.g., a mouse, a keyboard, etc.). Although a vehicle is illustrated in the example 500, the display 502 may include a control panel 510 for collecting information about any item that has compatibility with another item (e.g., a household appliance, an electronic device, an electromechanical device, etc.).

The online marketplace application 504 may filter for search results that are compatible with the item and/or apparatus indicated by the information provided by the user (e.g., via the control panel 510). For example, the items listed for sale at the online marketplace application 504 may have a compatibility with one or more other items, such as a vehicle. The online marketplace application 504 may propagate search results for output at the display 502 that correspond to items that are compatible with the item indicated by the information. For example, the online marketplace application 504 may propagate search results for output at the display 502 for items (e.g., components and/or accessories) that are compatible with a specified vehicle. In some examples, a user may provide additional input to indicate for the online marketplace application 504 to filter one or more search results, including a selection of a brand, a selection of a brand type, a manufacturer warranty, among other item features useable for filtering search results.

In some examples, at a second time, the computing device may generate a display 516 to confirm an item indicated by information from the control panel 510. The computing device may receive user input that triggers the display 516. The user input may indicate the user has providing sufficient information for an item and/or apparatus. The user input may include activation of a "Done" button by a navigation tool 514 (e.g., by clicking the navigation tool 514). The display 516 may include one or more buttons 518 selectable by a user to display search results filtered based on the information (e.g., a year, a make, a model, a trim etc.) and/or to change or otherwise update the information. Once the computing device receives user input indicating for the computing device to display the search results, then the computing device may generate a user interface displaying the search results, which is described in further detail with respect to FIG. 6.

Figure 6:
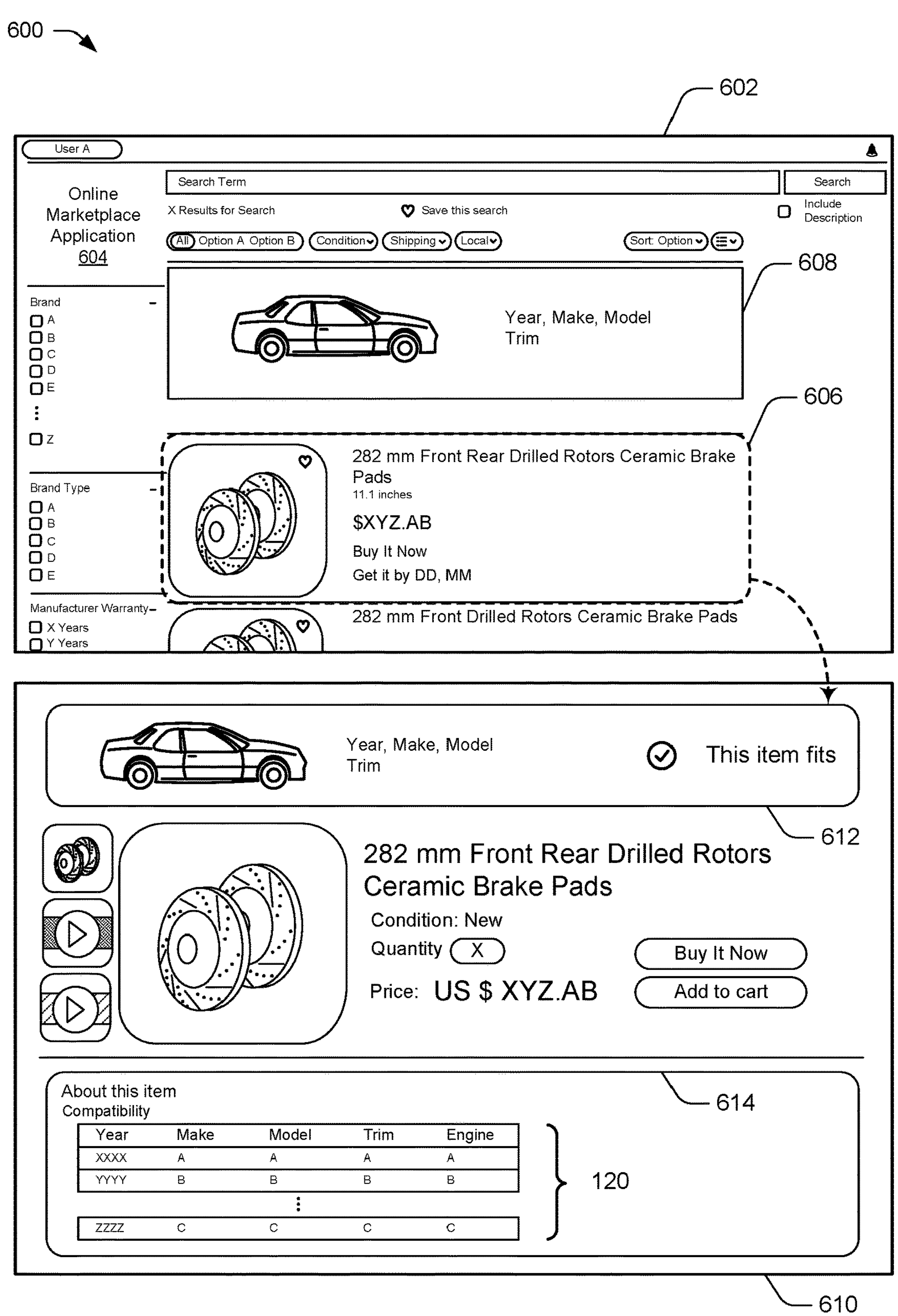

FIG. 6 depicts an example 600 of a user interface for detecting compatibility mismatch by generative artificial intelligence.

The illustrated example 600 includes displays via a user interface of a computing device, which is an example of the corresponding device as described with reference to FIG. 1. At a first time, the computing device generates the display 602. The display 602 may include an instance of an online marketplace application 604.

In some examples, the display 602 may include one or more features that a user may interact with. For example, the display 602 may include one or more published listings 606 of items for sale at the online marketplace application 604. The published listings 606 may include items that satisfy a compatibility with another item 608 and satisfy a threshold similarity value when compared with a search query. A user may specify information related to the other item 608, as described with reference to FIG. 5. In some examples, the other item 608 may be a vehicle with a year, make, model, and trim. In some other examples, the other item 608 may be any item compatible with other items. The published listing 606 may include an image of an item for sale at the online marketplace application 604, as well as a description of the item. The description may include information, such as a title of the item (e.g., "282 mm Front Rear Drilled Rotors Ceramic Brake Pads), a price of the item (e.g., $XYZ.AB), as well as additional information related to the item and/or delivery of the item.

In some examples, a computing device outputting the display 602 may receive user input indicating a selection of a published listing 606. In response to the user input, the computing device may output the display 610. The display 610 may include additional details describing the selected published listing 606. For example, the display 610 may include a compatibility message 612 that indicates whether the item in the published listing 606 is compatible with the item indicated by the user (e.g., a vehicle). In some examples, the display 610 may include compatibility display 614 that includes a list of recommended compatibilities 120. In some examples, if the item in the published listing 606 is a component, accessory, or otherwise related to a vehicle, then the list of recommended compatibilities 120 may include an indication of compatible vehicle types. For example, the list of recommended compatibilities 120 may include a year, a make, a model, a trim, and an engine type of one or more vehicles that are compatible with the item.

Although FIGS. 5 and 6 illustrate an example of a vehicle component as an item listed for sale via the online marketplace, the item may be any item that has compatibility with another item (e.g., including a component, an accessory, etc.).

Having discussed exemplary details of detecting compatibility mismatch by generative artificial intelligence, consider now some examples of procedures to illustrate additional aspects of the techniques.

Example Procedures

This section describes examples of procedures for detecting compatibility mismatch by generative artificial intelligence. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 7 depicts a procedure 700 in an example implementation of detecting compatibility mismatch by generative artificial intelligence.

At 702, compatibility data associated with a compatibility between a set of items and a set of categories of vehicles is obtained (e.g., by accessing a database). By way of example, a compatibility detection system accesses data storage to retrieve the compatibility data (e.g., a compatibility detection system 104, a storage device 114, and compatibility data 134, as described with reference to FIG. 1). The compatibility data may include a list of recommended compatibilities between the set of items and the set of categories of vehicles and a user reported compatibility between at least one item of the set of items and at least one category of vehicle of the set of categories of vehicles.

At 704, a machine learning model is generated for detecting a compatibility mismatch between a category of vehicle and an item based on providing at least a portion of the compatibility data as input to a generative artificial intelligence. By way of example, a generative artificial intelligence manager may use model training logic to generate the machine learning model (e.g., a generative artificial intelligence manger 106 and model training logic 130, as described with reference to FIG. 1). In variations, the machine learning model is a single machine learning model. In some other variations, the machine learning model includes multiple machine learning models (e.g., in a distributed network of machine learning models).

In some cases, a request for the compatibility data is transmitted to a device for display to a user (e.g., via a user interface of the device). User input corresponding to one or more of the list of recommended compatibilities or the user reported compatibility is received in response to the request. The one or more of the list of recommended compatibilities or the user reported compatibility are stored at a database based on processing the user input to determine the user reported compatibility. In variations, such as for text data and/or audio data that is converted to text data, the user input is parsed to determine respective string values and respective character values corresponding to one or more of the at least one item or the at least one category of vehicle. In some other variations, such as for visual data (e.g., images and/or video data), the user input is processed using image processing techniques to determine the at least one item or the at least one category of vehicle. The image processing techniques may include feature recognition and/or object recognition to detect one or more features of the item and/or to detect one or more features of a vehicle for categorizing the vehicle.

In some examples, one or more parameters (e.g., hyperparameters) of the machine learning model are modified to generate the machine learning model. By way of example, one or more hyperparameters of the machine learning model are modified until a performance criteria is satisfied. The performance criteria may include one or more of a threshold precision metric for the machine learning model, a threshold recall metric for the machine learning model, a threshold F1 score for the machine learning model, or a threshold return rate for the set of items (e.g., after implementing the machine learning model at an online marketplace). Modifying the parameters may include providing additional training datasets to the machine learning model to further train and/or fine-tune the machine learning model.

In some cases, additional compatibility data is provided as input to the machine learning model to detect the compatibility mismatch based on the performance criteria being satisfied. The additional compatibility data includes at least one user reported compatibility indicating a category of a vehicle and an item that have a compatibility mismatch. In some examples, an indication of the compatibility mismatch is received as output from the machine learning model based on providing at least one user reported compatibility corresponding to the category of vehicle and the item as input to the machine learning model.

At 706, an update to the list of recommended compatibilities is determined based on detecting the compatibility mismatch using the machine learning model. In some examples, an indication of the update to the list of recommended compatibilities is transmitted to a device for display to a user (e.g., via a user interface of the device). In response to the indication, a request to perform the update to the list of recommended compatibilities may be received.

In some examples, the update to the list of recommended compatibilities is performed. The update to the list of recommended compatibilities may include one or more of removing the category of vehicle from a list of recommended compatibilities for the item or adding the category of vehicle to the list of recommended compatibilities for the item.

FIG. 8 depicts a procedure 800 in an example implementation of detecting compatibility mismatch by generative artificial intelligence.

At 802, compatibility data between a set of items is obtained (e.g., by accessing a database). By way of example, a compatibility detection system accesses data storage to retrieve the compatibility data (e.g., a compatibility detection system 104, a storage device 114, and compatibility data 134, as described with reference to FIG. 1). The compatibility data may include a list of recommended compatibilities between the set of items and a user reported compatibility associated with at least one item of the set of items.

At 804, a machine learning model is generated for detecting a compatibility mismatch between a first item of the set of items and a second item of the set of items based on providing at least a portion of the compatibility data as input to a generative artificial intelligence. By way of example, a generative artificial intelligence manager may use model training logic to generate the machine learning model (e.g., a generative artificial intelligence manger 106 and model training logic 130, as described with reference to FIG. 1). In variations, the machine learning model is a single machine learning model. In some other variations, the machine learning model includes multiple machine learning models (e.g., in a distributed network of machine learning models).

In some cases, a request for the compatibility data is transmitted to a device for display to a user (e.g., via a user interface of the device). User input corresponding to one or more of the list of recommended compatibilities or the user reported compatibility is received in response to the request. The one or more of the list of recommended compatibilities or the user reported compatibility are stored at a database based on processing the user input to determine the user reported compatibility. In variations, such as for text data and/or audio data that is converted to text data, the user input is parsed to determine respective string values and respective character values corresponding to one or more of the at least one item or the at least one category of vehicle. In some other variations, such as for visual data (e.g., images and/or video data), the user input is processed using image processing techniques to determine the at least one item or the at least one category of vehicle. The image processing techniques may include feature recognition and/or object recognition to detect one or more features of the first item and/or to detect one or more features of the second item.

In some examples, one or more parameters (e.g., hyperparameters) of the machine learning model are modified to generate the machine learning model. By way of example, one or more hyperparameters of the machine learning model are modified until a performance criteria is satisfied. The performance criteria may include one or more of a threshold precision metric for the machine learning model, a threshold recall metric for the machine learning model, a threshold F1 score for the machine learning model, or a threshold return rate for the set of items (e.g., after implementing the machine learning model at an online marketplace). Modifying the parameters may include providing additional training datasets to the machine learning model to further train and/or fine-tune the machine learning model.

In some cases, additional compatibility data is provided as input to the machine learning model to detect the compatibility mismatch based on the performance criteria being satisfied. The additional compatibility data includes at least one user reported compatibility indicating items that have a compatibility mismatch. In some examples, an indication of the compatibility mismatch is received as output from the machine learning model based on providing at least one user reported compatibility corresponding to the first item and the second item as input to the machine learning model.

At 806, an update to the list of recommended compatibilities is determined based on detecting the compatibility mismatch using the machine learning model. In some examples, an indication of the update to the list of recommended compatibilities is transmitted to a device for display to a user (e.g., via a user interface of the device). In response to the indication, a request to perform the update to the list of recommended compatibilities may be received.

In some examples, the update to the list of recommended compatibilities is performed. The update to the list of recommended compatibilities may include one or more of removing the first item from a list of recommended compatibilities for the second item, removing the second item from a list of recommended compatibilities for the first item, adding the first item to the list of recommended compatibilities for the second item, or adding the second item to the list of recommended compatibilities for the first item.

Having described examples of procedures in accordance with one or more implementations, consider now an example of a system and device that can be utilized to implement the various techniques described herein.

Example System and Device

FIG. 9 illustrates an example of a system generally at 900 that includes an example of a computing device 902 that is representative of one or more computing systems and/or devices that may implement the various techniques described herein. This is illustrated through inclusion of the application 110 and the compatibility detection system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 906 is illustrated as including memory/storage 912. The memory/storage 912 represents memory/storage capacity associated with one or more computer-readable media. The memory/storage 912 may include volatile media (such as random-access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method performed by a server device, the method comprising:

retrieving compatibility data from a database, the compatibility data comprising a list of recommended compatibilities between a plurality of items and a plurality of categories of vehicles and a first user reported compatibility between at least one item of the plurality of items and at least one category of vehicle of the plurality of categories of vehicles;

training, by an artificial intelligence model manager and using at least a portion of the compatibility data, a machine learning model to detect a compatibility mismatch between a category of vehicle and an item, wherein the machine learning model comprises a large language model;

receiving, from a computing device, a second user reported compatibility corresponding to the category of vehicle and the item to provide as input to the machine learning model;

automatically generating, in response to receiving the second user reported compatibility and as output from the machine learning model, an update to the list of recommended compatibilities based on detecting the compatibility mismatch between the category of vehicle and the item;

filtering, based on the update to the list of recommended compatibilities, a plurality of search results to obtain one or more filtered search results; and transmitting, to the computing device, instructions to cause the computing device to output a user interface comprising the one or more filtered search results.

2. The method of claim 1, wherein training the machine learning model further comprises continuously modifying one or more parameters of the machine learning model until a numerical quantity of detected compatibility mismatches satisfies a threshold value.

3. The method of claim 2, wherein modifying the one or more parameters of the machine learning model is based on providing additional compatibility data as the input to the machine learning model.

4. The method of claim 2, wherein detecting the compatibility mismatch further comprises providing additional compatibility data as the input to the machine learning model based on the threshold value being satisfied, wherein the additional compatibility data comprises at least one user reported compatibility corresponding to the category of vehicle and the item.

5. The method of claim 2, wherein the threshold value is associated with one or more of a threshold precision metric associated with the machine learning model, a threshold recall metric associated with the machine learning model, a threshold F1 score associated with the machine learning model, or a threshold return rate associated with the plurality of items.

6. The method of claim 1, wherein detecting the compatibility mismatch further comprises receiving, as the output from the machine learning model, an indication of the compatibility mismatch based on providing at least one user reported compatibility corresponding to the category of vehicle and the item as the input to the machine learning model.

7. The method of claim 1, further comprising:

transmitting an indication of the update to the list of recommended compatibilities to an additional computing device for display to a user; and receiving, in response to the indication, a request to perform the update to the list of recommended compatibilities.

8. The method of claim 1, further comprising performing the update to the list of recommended compatibilities, wherein the update to the list of recommended compatibilities includes one or more of removing the category of vehicle from a list of recommended compatibilities for the item or adding the category of vehicle to the list of recommended compatibilities for the item.

9. The method of claim 1, further comprising:

transmitting a request for the compatibility data to an additional computing device for display to a user;

receiving user input corresponding to one or more of the list of recommended compatibilities or the first user reported compatibility in response to the request; and storing the one or more of the list of recommended compatibilities or the first user reported compatibility at the database based on processing the user input to determine the first user reported compatibility.

10. The method of claim 9, wherein the processing further comprises parsing the user input to determine respective string values and respective character values corresponding to one or more of the at least one item or the at least one category of vehicle.

11. The method of claim 1, further comprising:

receiving, from the computing device, a search query for the item; and selecting the plurality of search results based on a similarity between the search query and an additional plurality of items associated with the plurality of search results satisfying a threshold value.

12. The method of claim 1, wherein receiving the second user reported compatibility comprises:

receiving at least one of text data, audio data, or visual data that indicates the second user reported compatibility;

parsing, based on receiving the text data, the text data to determine the second user reported compatibility;

converting, based on receiving the audio data, the audio data to additional text data;

parsing the additional text data to determine the second user reported compatibility; and performing, based on receiving the visual data, one or more of feature detection or object detection to determine the second user reported compatibility.

13. A system comprising:

one or more processors; and a computer-readable storage medium storing instructions that are executable by the one or more processors to perform operations comprising:

retrieving compatibility data from a database, the compatibility data comprising a list of recommended compatibilities between a plurality of items and a plurality of categories of vehicles and a first user reported compatibility between at least one item of the plurality of items and at least one category of vehicle of the plurality of categories of vehicles;

training, by an artificial intelligence model manager and using at least a portion of the compatibility data, a machine learning model to detect a compatibility mismatch between a category of vehicle and an item, wherein the machine learning model comprises a large language model;

receiving, from a computing device, a second user reported compatibility corresponding to the category of vehicle and the item to provide as input to the machine learning model;

automatically generating, in response to receiving the second user reported compatibility and as output from the machine learning model, an update to the list of recommended compatibilities based on detecting the compatibility mismatch between the category of vehicle and the item;

filtering, based on the update to the list of recommended compatibilities, a plurality of search results to obtain one or more filtered search results; and transmitting, to the computing device, additional instructions to cause the computing device to output a user interface comprising the one or more filtered search results.

14. A computer-implemented method performed by a first device, the computer-implemented method comprising:

obtaining compatibility data between a plurality of items, the compatibility data comprising a list of recommended compatibilities between the plurality of items and a first user reported compatibility associated with at least one item of the plurality of items;

training, by an artificial intelligence model manager and using at least a portion of the compatibility data, a machine learning model to detect a compatibility mismatch between a first item of the plurality of items and a second item of the plurality of items, wherein the machine learning model comprises a large language model;

obtaining a second user reported compatibility associated with the at least one item to provide as input to the machine learning model;

automatically generating, in response to obtaining the second user reported compatibility and as output from the machine learning model, an update to the list of recommended compatibilities based on detecting the compatibility mismatch between the first item and the second item;

filtering, based on the update to the list of recommended compatibilities, a plurality of search results to obtain one or more filtered search results; and transmitting, to a computing second device, instructions to cause the computing second device to output a user interface comprising the one or more filtered search results.

15. A computer-implemented method performed by a first device, the computer-implemented method comprising:

obtaining compatibility data between a plurality of items, the compatibility data comprising a list of recommended compatibilities between the plurality of items and a first user reported compatibility associated with at least one item of the plurality of items;

training, by an artificial intelligence model manager and using at least a portion of the compatibility data, a machine learning model to detect a compatibility mismatch between a first item of the plurality of items and a second item of the plurality of items, wherein the machine learning model comprises a large language model;

obtaining a second user reported compatibility associated with the at least one item to provide as input to the machine learning model;

automatically generating, in response to obtaining the second user reported compatibility and as output from the machine learning model, an update to the list of recommended compatibilities based on detecting the compatibility mismatch between the first item and the second item;

filtering, based on the update to the list of recommended compatibilities, a plurality of search results to obtain one or more filtered search results; and transmitting, to a second device, instructions to cause the second device to output a user interface comprising the one or more filtered search results.

16. The computer-implemented method of claim 15, wherein detecting the compatibility mismatch further comprises providing additional compatibility data as the input to the machine learning model based on the threshold value being satisfied, wherein the additional compatibility data comprises at least one user reported compatibility corresponding to the first item and the second item.

17. The computer-implemented method of claim 14, wherein detecting the compatibility mismatch further comprises receiving, as the output from the machine learning model, an indication of the compatibility mismatch based on providing at least one user reported compatibility corresponding to the first item and the second item as the input to the machine learning model.

18. The computer-implemented method of claim 15, further comprising transmitting an indication of the update to the list of recommended compatibilities to a third device for display to a user.

19. The computer-implemented method of claim 14, further comprising performing the update to the list of recommended compatibilities, wherein the update to the list of recommended compatibilities comprises one or more of removing the first item from a list of recommended compatibilities for the second item, removing the second item from a list of recommended compatibilities for the first item, adding the first item to the list of recommended compatibilities for the second item, or adding the second item to the list of recommended compatibilities for the first item.

20. The computer-implemented method of claim 15, further comprising:

transmitting a request for the compatibility data to a third device for display to a user;

receiving user input corresponding to one or more of the list of recommended compatibilities or the first user reported compatibility in response to the request; and storing the one or more of the list of recommended compatibilities or the first user reported compatibility at a database based on processing the user input to determine the first user reported compatibility.

* * * * *